(12) United States Patent
Maleki et al.

(10) Patent No.: US 9,693,042 B2
(45) Date of Patent: Jun. 27, 2017

(54) FOREGROUND AND BACKGROUND DETECTION IN A VIDEO

(71) Applicant: BitAnimate, Inc., Lake Oswego, OR (US)

(72) Inventors: Behrooz A. Maleki, Tualatin, OR (US); Sarvenaz Sarkhosh, Tualatin, OR (US)

(73) Assignee: BITANIMATE, INC., Lake Oswego, OR (US)

( * ) Notice: Subject to any disclaimer, the term of this patent is extended or adjusted under 35 U.S.C. 154(b) by 240 days.

(21) Appl. No.: 14/301,143

(22) Filed: Jun. 10, 2014

(65) Prior Publication Data

US 2015/0358607 A1    Dec. 10, 2015

(51) Int. Cl.
| | | |
|---|---|---|
| *G06T 7/194* | (2017.01) | |
| *G06T 7/215* | (2017.01) | |
| *H04N 13/02* | (2006.01) | |
| *G06T 7/11* | (2017.01) | |
| *H04N 13/00* | (2006.01) | |

(52) U.S. Cl.
CPC .......... *H04N 13/0264* (2013.01); *G06T 7/11* (2017.01); *G06T 7/194* (2017.01); *G06T 7/215* (2017.01); *H04N 13/0022* (2013.01); *H04N 13/0221* (2013.01); *G06T 2207/10016* (2013.01); *H04N 2013/0081* (2013.01); *H04N 2013/0092* (2013.01)

(58) Field of Classification Search
CPC combination set(s) only.
See application file for complete search history.

(56) References Cited

U.S. PATENT DOCUMENTS

| | | | |
|---|---|---|---|
| 7,161,614 B1 | 1/2007 | Yamashita et al. | |
| 2010/0201820 A1* | 8/2010 | Lopota ................ | G06T 7/2053 348/152 |
| 2012/0127267 A1* | 5/2012 | Zhang .................. | G06T 7/0071 348/43 |
| 2012/0243802 A1* | 9/2012 | Fintel .................. | H04N 5/2625 382/284 |
| 2013/0169749 A1 | 7/2013 | Zhou et al. | |
| 2014/0233801 A1* | 8/2014 | Cho ...................... | G06T 7/206 382/103 |

OTHER PUBLICATIONS

International Search Report and Written Opinion dated Nov. 26, 2015 as received in Application No. PCT/US2015/035186.

\* cited by examiner

*Primary Examiner* — Sath V Perungavoor
*Assistant Examiner* — Janese Duley
(74) *Attorney, Agent, or Firm* — Maschoff Brennan

(57) ABSTRACT

A method of analyzing a video may include determining at least one of a fastest moving element, a slow moving element and a dominant element within a video based on a first frame of the video and a second frame of the video. The method may also include determining at least one of a foreground and a background within the video based on at least one of the fastest moving element, the slow moving element and the dominant element.

8 Claims, 17 Drawing Sheets

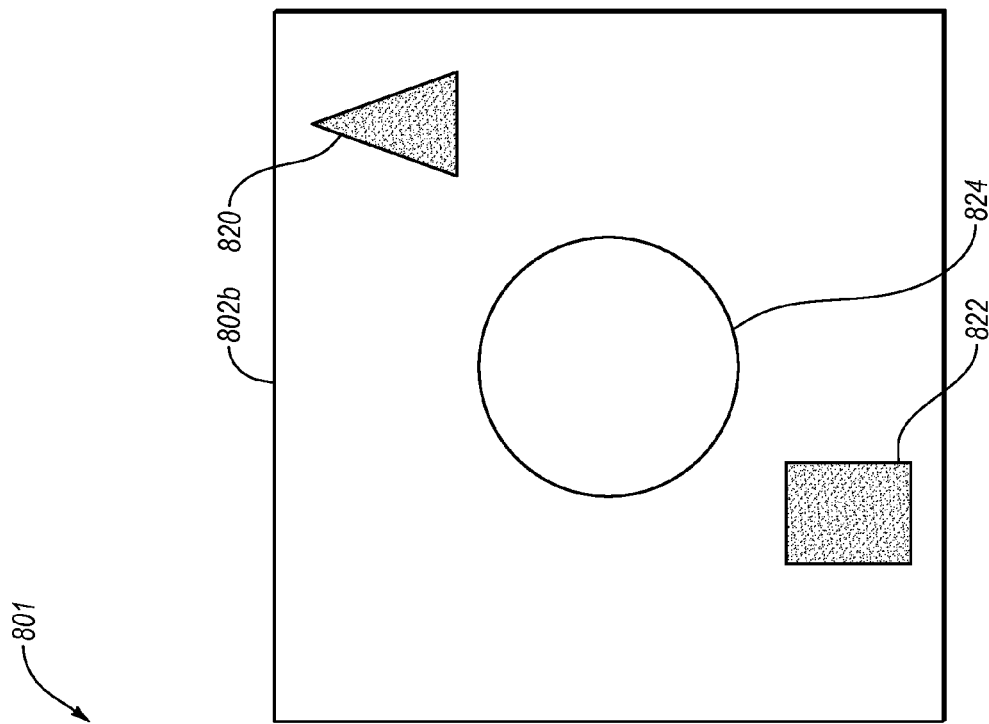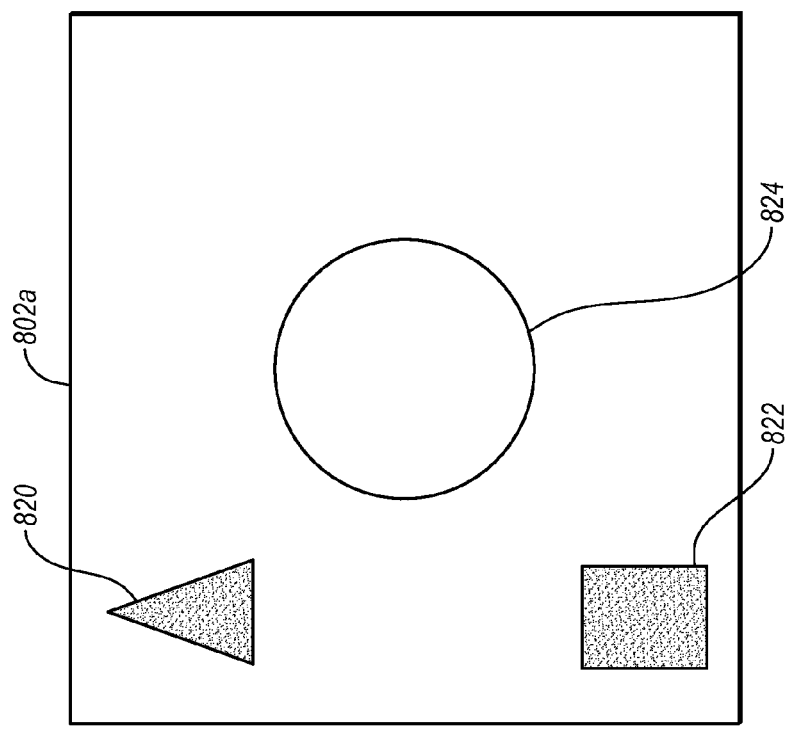
Fig. 8

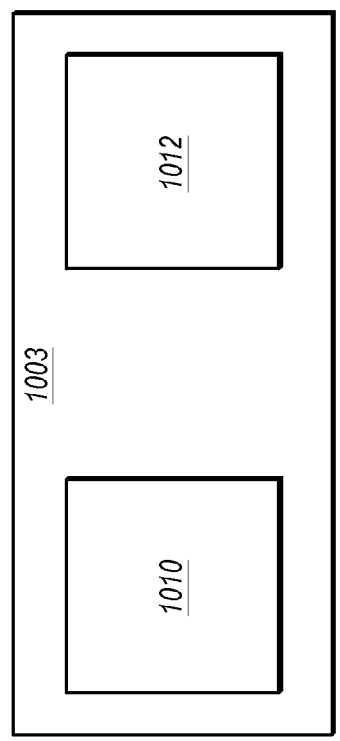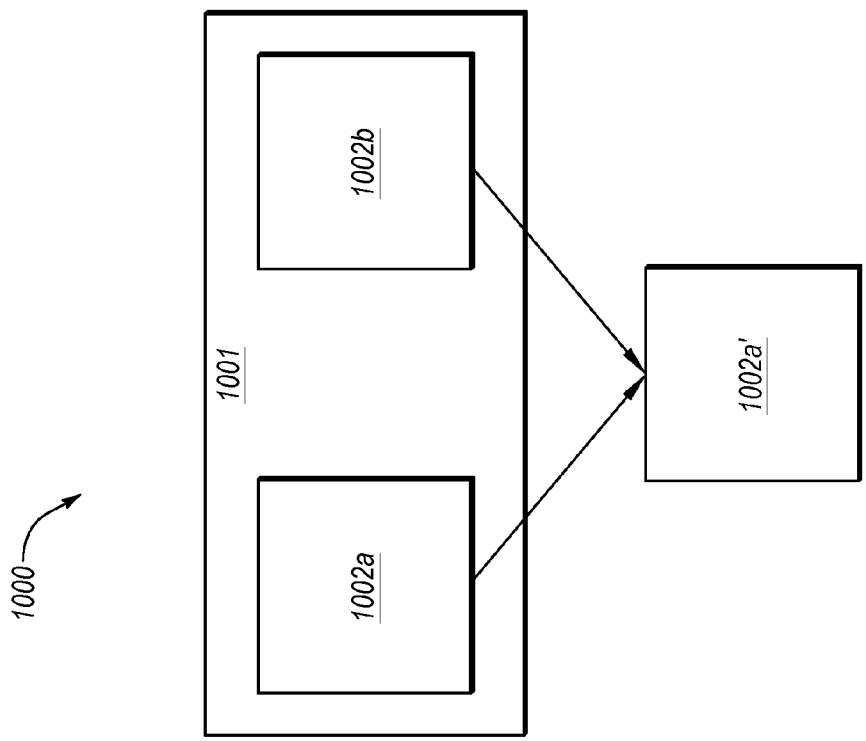
Fig. 10

FOREGROUND AND BACKGROUND DETECTION IN A VIDEO

FIELD

The present disclosure relates to foreground and background detection in a video.

BACKGROUND

Three-dimensional (stereoscopic) imaging to produce three-dimensional videos (e.g., television, movies, etc.) has become increasingly popular in recent years. One reason for this is that there has been a significant improvement in the camera and postproduction technologies used to create three-dimensional video. Another reason that three-dimensional videos are becoming popular is that the entertainment-viewing public appears willing to pay a premium for this special effect.

However, three-dimensional filming technologies are such that it is significantly more expensive to film a video using three-dimensional technology as compared to using two-dimensional (monoscopic) technology. In addition, there are millions of two-dimensional videos that have already been produced but were not filmed using three-dimensional technologies.

As such, many have been trying to convert two-dimensional videos into three-dimensional videos. These methods to convert two-dimensional videos for three-dimensional viewing, however, may not work, are resource intensive, and/or do not produce acceptable results (e.g., produce a cardboard cutout effect).

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of analyzing a video may include determining at least one of a fastest moving element, a slow moving element and a dominant element within a video based on a first frame of the video and a second frame of the video. The method may also include determining at least one of a foreground and a background within the video based on at least one of the fastest moving element, the slow moving element and the dominant element.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 8 illustrates example frames of a monoscopic video where the frames include a fastest-moving element, a slow-moving element, and a dominant element;

FIG. 10 illustrates an example block diagram for generating a left-eye viewing frame and a right-eye viewing frame of a stereoscopic video from a monoscopic video based on movement of the foreground and/or background associated with the monoscopic video;

DESCRIPTION OF EMBODIMENTS

Figure 1:
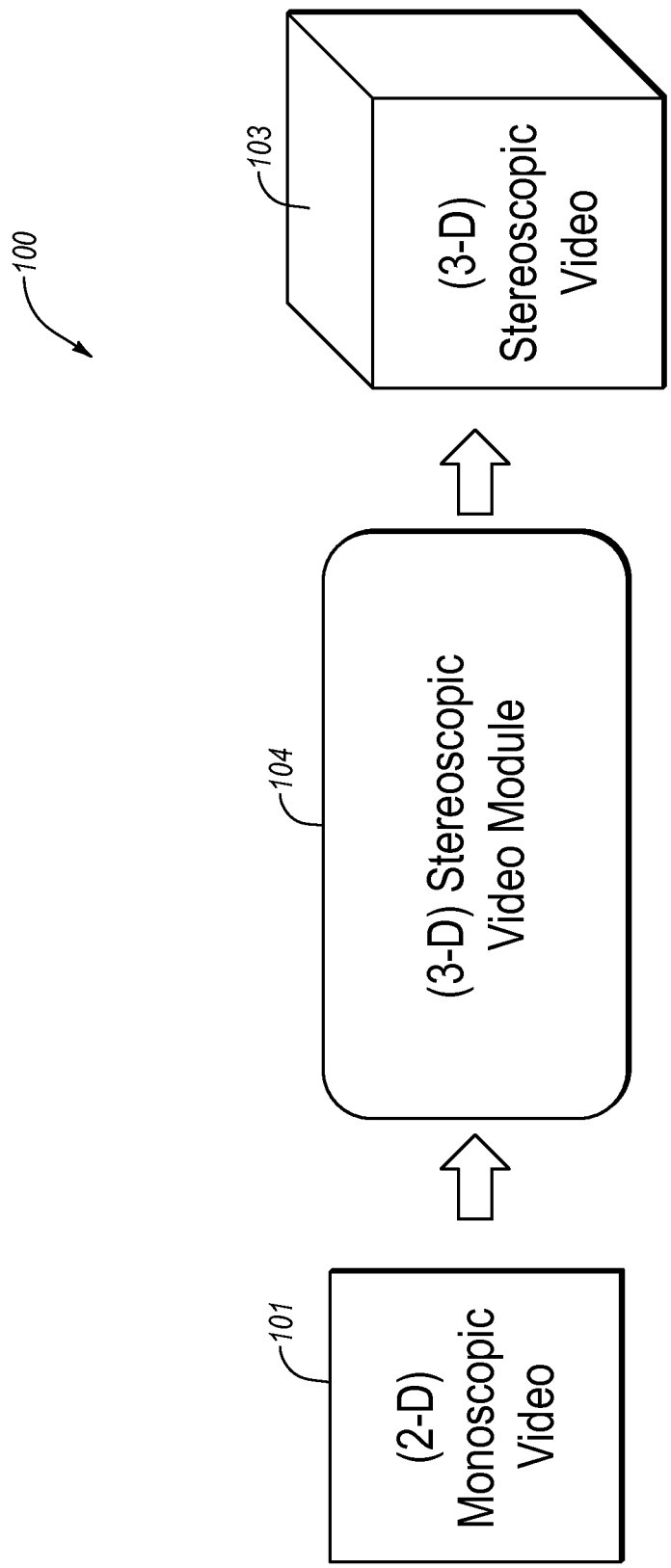
FIG. 1 illustrates an example system for generating a stereoscopic (3-D) video based on a monoscopic (2-D) video.

Humans have a binocular vision system that uses two eyes spaced approximately two and a half inches (approximately 6.5 centimeters) apart. Each eye sees the world from a slightly different perspective. The brain uses the difference in these perspectives to calculate or gauge distance. This binocular vision system is partly responsible for the ability to determine with relatively good accuracy the distance of an object. The relative distance of multiple objects in a field of view may also be determined with the help of binocular vision.

Three-dimensional (stereoscopic) imaging takes advantage of the depth perceived by binocular vision by presenting two images to a viewer where one image is presented to one eye (e.g., the left eye) and the other image is presented to the other eye (e.g., the right eye). The images presented to the two eyes may include substantially the same elements, but the elements in the two images may be offset from each other to mimic the offsetting perspective that may be perceived by the viewer's eyes in everyday life. Therefore, the viewer may perceive depth in the elements depicted by the images.

Traditionally, three-dimensional videos have been made using two video sources (e.g., cameras) that are mounted side by side, about three to eight inches apart, to capture a setting as it may be perceived by the two different eyes. This distance is often referred to as the "interaxial" or "interocular distance." Accordingly, the two video sources create two videos; one for the left eye and one for the right eye. The two videos may be put together as a stereoscopic (or "3-D") video, where the right-eye video is presented to the viewer's right eye and the left-eye video is presented to the viewer's left eye such that the viewer perceives the video in three dimensions. In contrast, in accordance with some embodiments of the present disclosure, a stereoscopic video may be derived from a video obtained by using a single (monoscopic) video source. These videos derived from a monoscopic video source may be referred to as "2-D" or "monoscopic videos."

The term "video" may refer to any motion-type picture and may include, by way of example and not limitation, movies, television shows, recorded events (e.g., sporting events, concerts, etc.), home movies, Internet videos, etc. A video is made up of a series of "frames" (referred to as "frames" or "video frames") that each display an image of a setting that may include elements or objects (referred to generally as "elements"). Elements may be moving or may be stationary. For example, a frame may be an image of a landscape that may include elements such as mountains, hills, trees, animals, buildings, planes, trains, automobiles, etc.

According to some embodiments, the movement of elements between a first frame of a monoscopic video with respect to a second frame of the monoscopic video (e.g., a subsequent frame or a previous frame of the first frame) may be used to generate one or more modified first frames that may correspond with the first frame and may be used to generate the stereoscopic video. In some embodiments, the first and second frames may be consecutive frames, and in other embodiments, one or more intermediate frames may be included between the first and second frames. The first frame and the modified first frames may include substantially the same elements with one or more elements offset from each other in the first frame and the modified first frames based on the movement of elements between the first frame and the second frame. Additionally, the movement of elements may be used to analyze a camera effect (e.g., a zooming effect, a panning effect, a rotating effect, and/or a stationary effect) with respect to the first frame and the second frame. In some embodiments, the modified first frames may be generated based on the analyzed camera effect.

In some embodiments, a left-eye viewing frame, which may be configured to be viewed by a viewer's left eye, may be generated based on the determined camera effect and at least one of the first frame and the modified first frames. Similarly, a right-eye viewing frame, which may be configured to be viewed by a viewer's right eye, may also be generated based on the determined camera effect and at least one of the first frame and the modified first frames. This process may be repeated for multiple frames of the monoscopic video to generate corresponding left-eye and right-eye viewing frames of a stereoscopic video. Accordingly, in such embodiments, a stereoscopic video may be generated from a monoscopic video based on the analyzed camera effect and movement between the first frame and the second frame associated therewith.

Additionally, in some embodiments, the generation of the left-eye viewing frame and the right-eye viewing frame may be based on a determination of movement of at least one of a foreground and a background of a scene of the monoscopic video associated with the first frame and the second frame. In these or other embodiments, the foreground and/or background may be determined based on a fastest-moving element, a slow-moving element, and/or a dominant element included in the scene associated with the first frame and the second frame.

Additionally, the amount of depth in the stereoscopic video may be modified by adjusting the offset between elements included in the left-eye viewing frame and the right-eye viewing frame. Further, the perception of which elements may be within the foreground or background of a setting associated with the stereoscopic video may also be modified by adjusting the offset between elements.

The right-eye viewing frames and the left-eye viewing frames described herein may also be referred to as "right-eye images" and "left-eye images," respectively. Additionally, the right-eye viewing frames and the left-eye viewing frames may be used to generate stereoscopic videos using any suitable 3D format such as top/bottom, left/right, SENSIO® Hi-Fi 3D, Blu-ray® 3D, or any other applicable 3D format.

FIG. 1 illustrates an example system 100 for generating a stereoscopic (3-D) video 103 based on a monoscopic (2-D) video 101, according to some embodiments of the present disclosure. The system 100 may include a three-dimensional (stereoscopic) video generation module 104 (referred to hereinafter as "stereoscopic video module 104"). The stereoscopic video module 104 may include any suitable system, apparatus, or device configured to receive the monoscopic video 101 and convert the monoscopic video 101 into the stereoscopic video 103. For example, in some embodiments, the stereoscopic video module 104 may be software that includes computer-executable instructions configured to cause a processor to perform operations for converting the monoscopic video 101 into the stereoscopic video 103.

The stereoscopic video module 104 may be configured to generate the stereoscopic video 103 based on the movement of one or more elements between frames of the monoscopic video 101. In some embodiments, the stereoscopic video module 104 may generate modified frames based on the movement. The generation of the modified frames that may be performed by the stereoscopic video module 104 is discussed in further detail below with respect to FIGS. 2 and 3. In some embodiments, the stereoscopic video module 104 may also be configured to analyze and determine a camera effect associated with the monoscopic video 101 based on the movement of elements between frames. In these embodiments, the stereoscopic video module 104 may be configured to generate the modified frames and the left-eye and right-eye viewing frames for the stereoscopic video 103 based on the determined camera effect and the movement associated therewith. Further, in some embodiments, the stereoscopic video module 104 may be configured to generate the modified frames and the left-eye and right-eye viewing frames based on a determination of movement associated with the foreground and background within a scene of the monoscopic video 101. The analysis of the camera effect and generation of the modified frames and the left-eye and right-eye viewing frames that may be performed by the stereoscopic video module 104 based on the analyzed camera effect is discussed in further detail with respect to FIGS. 4-7 and 10.

In some embodiments, the stereoscopic video module 104 may also be configured to determine the foreground and/or background of a scene of the monoscopic video 101. In some of these embodiments, the stereoscopic video module 104 may be configured to determine the foreground and/or background based on a fastest-moving element, a slow-moving element, and/or a dominant element included in a scene of the monoscopic video 101. The determination of the fastest-moving element, slow moving element, and/or the dominant element is further detailed with respect to FIG. 8. The determination of the foreground and/or background that may be performed by the stereoscopic video module 104 is explained in further detail below with respect to FIG. 9.

Further, in some embodiments, the stereoscopic video module 104 may be configured to adjust the amount of depth perceived by a viewer watching the stereoscopic video 103 by adjusting the offset between elements included in the left-eye and right-eye viewing frames. The modification of depth perception that may be performed by the stereoscopic video module 104 is discussed in further detail below with respect to FIGS. 12A-12C and 13. Additionally, in some embodiments, the stereoscopic video module 104 may also be configured to adjust a focus point of the stereoscopic video 103 such that the stereoscopic video module 104 may modify the perception of which elements may be within the foreground or background of a setting as perceived by the viewer. The modification of the focus point that may be performed by the stereoscopic video module 104 is discussed in further detail below with respect to FIGS. 12A, 12B, 12D, and 14.

Figure 2:
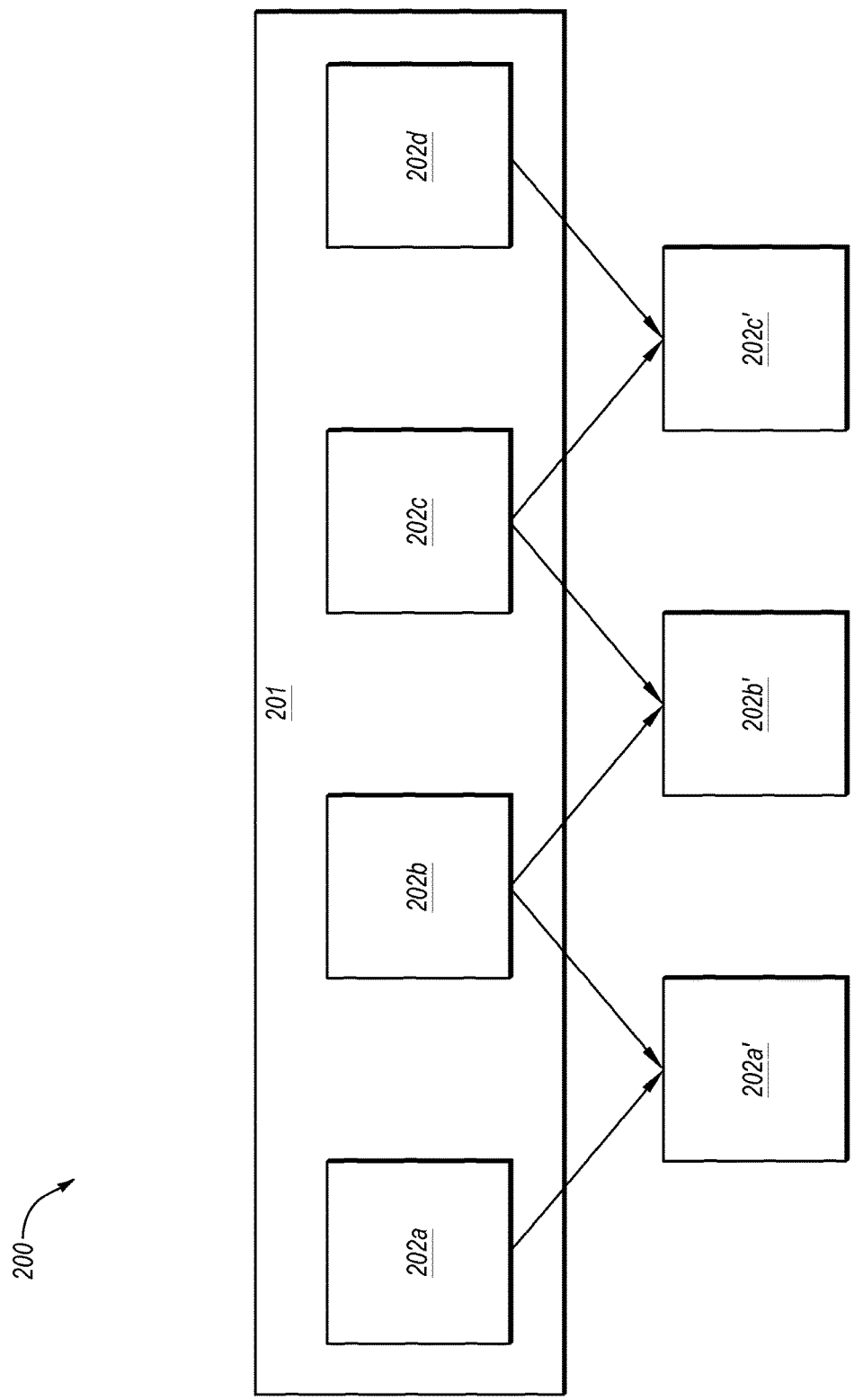
FIG. 2 illustrates an example block diagram depicting the generation of modified frames associated with a monoscopic video based on movement of elements between different frames of a monoscopic video.

As mentioned above, the stereoscopic video module 104 may be configured to generate modified frames that may be used for generating left- and/or right-eye viewing frames of the stereoscopic video 103 based on movement of one or more elements between frames. FIG. 2 illustrates an example block diagram 200 depicting the generation of modified frames 202' based on movement of elements between different frames 202 of a monoscopic video 201, according to some embodiments of the present disclosure. In some embodiments, and given as an example with respect to FIG. 2, the modified frames 202' may be generated by a stereoscopic video module, such as the stereoscopic video module 104 described above with respect to FIG. 1. As depicted in FIG. 2, the monoscopic video 201 may be substantially similar to the monoscopic video 101 described with respect to FIG. 1 and may include a series of frames 202 that may include images of one or more settings associated with the monoscopic video 201. According to some embodiments of the present disclosure, the stereoscopic video module may generate the modified frames 202' based on horizontal movement between the frames 202 of one or more elements (not expressly illustrated) between the frames 202.

For example, an element in the frames 202*a* and 202*b* (where the frame 202*b* may be a subsequent frame with respect to the frame 202*a*) may have a change in position between the frame 202*a* and the frame 202*b* such that the element may move horizontally from the left to the right between frames 202*a* and 202*b*. Accordingly, the stereoscopic video module may generate the modified frame 202*a*' based on the horizontal movement of the element between frames 202*a* and 202*b* such that the element is offset to the right in the modified frame 202*a*' with respect to the frame 202*a*. The stereoscopic video module may similarly generate the modified frame 202*b*' based on frames 202*b* and 202*c* (where the frame 202*c* may be a subsequent frame with respect to the frame 202*b*), and the modified frame 202*c*' based on frames 202*c* and 202*d* (where the frame 202*d* may be a subsequent frame with respect to the frame 202*c*). Accordingly, the elements of the modified frames 202' may be horizontally offset with respect to the corresponding elements of the corresponding frames 202 based on horizontal movement of elements between frames to mimic the horizontal offset of images as perceived by a viewer's right eye and left eye.

In some embodiments, the movement of an element between frames 202 may also be in a vertical direction (referred to as "vertical movement"). However, because a viewer's eyes are generally not substantially offset in a vertical direction, the stereoscopic video module may substantially ignore the vertical movement of elements between frames 202 when generating modified frames 202'. Therefore, modified frames 202' may be generated such that their elements are horizontally offset in modified frames 202' with respect to the corresponding elements in their associated frame 202 based on the horizontal movement. However, the elements of the modified frames 202' may not be vertically offset to a substantial degree with respect to the corresponding elements of their associated frames 202 even if vertical movement occurs between frames.

Additionally, in some embodiments, the movement of elements from one frame to another frame may result in one or more elements in a frame not being present in a subsequent frame that may be used to generate a modified frame. In such instances, the stereoscopic video module 104 may copy the missing elements from the original frame and place them in the associated modified frame.

For example, an element of the frame 202*a* may be a hand of a person and movement of the person between the frame 202*a* and the frame 202*b* may be such that the hand of the person is not visible in the frame 202*b*. Additionally, the modified frame 202*a*' may be generated based on horizontal movement of the person from the frame 202*a* to the frame 202*b*. Therefore, in generating the modified frame 202*a*' based on the horizontal movement of the person, the person may be horizontally offset in the modified frame 202*a*' based on the horizontal offset of the person between frames 202*a* and 202*b*. However, the person's hand may be copied from the frame 202*a* and inserted in the modified frame 202*a*'. Consequently, the hand may be present in the modified frame 202*a*' even though the hand may be missing from the frame 202*b* from which the horizontal offset of the elements of the modified frame 202*a*' may be derived.

Modifications, additions, or omissions may be made to FIG. 2 without departing from the scope of the present disclosure. For example, the monoscopic video 201 may include more or fewer frames than those explicitly illustrated. Further, in some embodiments, one or more intermediate frames may be included between the frames illustrated. For example, the monoscopic video 201 may include one or more intermediate frames that may be between frames 202a and 202b, frames 202b and 202c, and/or frames 202c and 202d. Additionally, in some embodiments, a scene within the monoscopic video 201 may change such that one frame 202 may be associated with one scene and a subsequent frame may be associated with a different scene. In the present disclosure, a "scene" may refer to a particular camera perspective or angle with respect to a particular setting such that a "scene change" or change in a scene may refer to a change in a camera angle or perspective of the same setting and/or a change in setting depicted in a video. In such embodiments, a modified frame may be generated based on an inferred frame where the inferred frame may be based on movement of one or more elements identified in previous frames.

Figure 3:
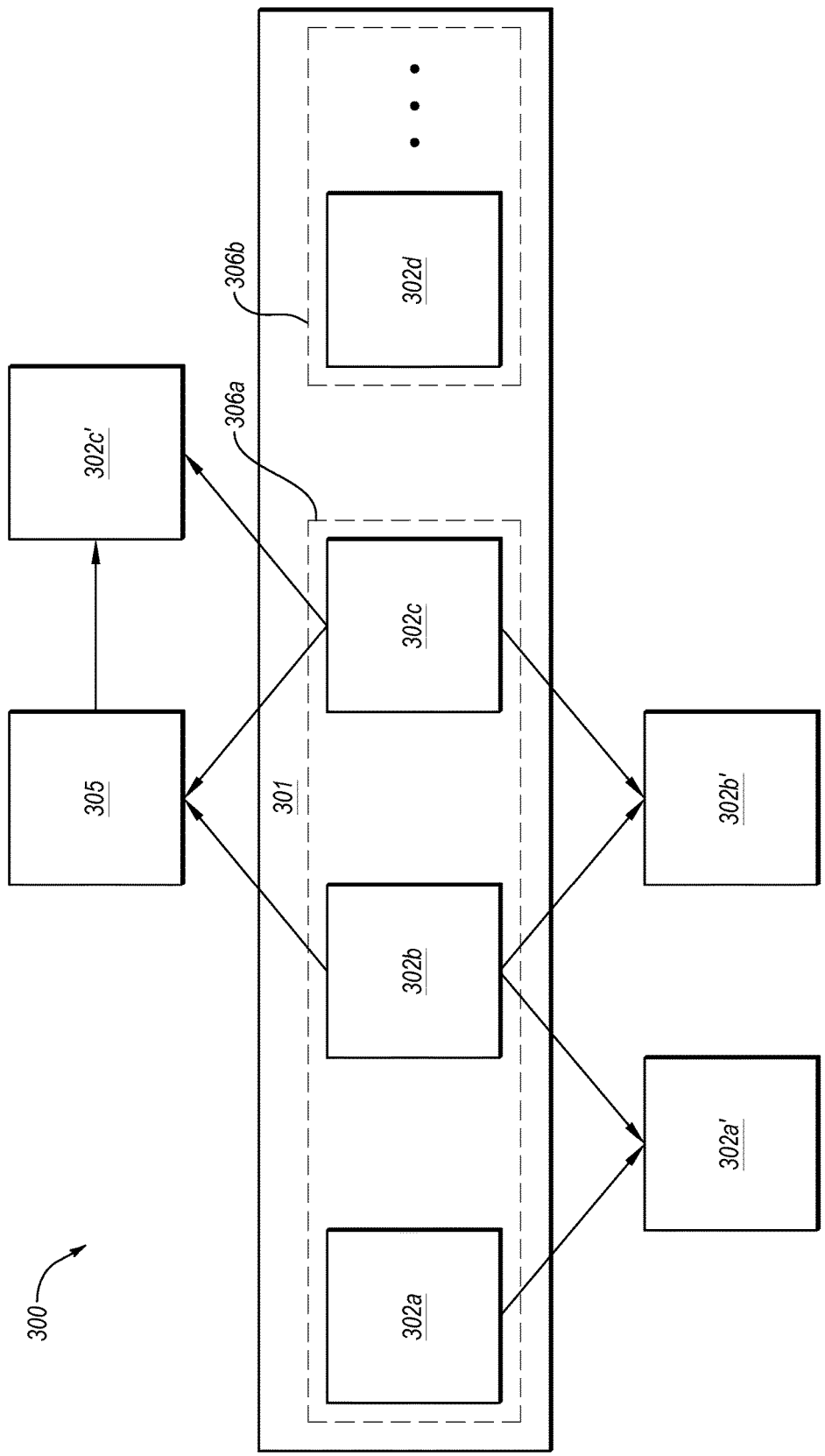
FIG. 3 illustrates an example block diagram depicting the generation of modified frames associated with a monoscopic video where one or more of the modified frames may be generated based on one or more inferred frames of a monoscopic video.

FIG. 3 illustrates an example block diagram 300 depicting the generation of modified frames 302' where one or more modified frames 302' may be generated based on one or more inferred frames 305 of a monoscopic video 301, according to some embodiments of the present disclosure. In some embodiments, and given as an example with respect to FIG. 3, the modified frames 302' may be generated by a stereoscopic video module such as the stereoscopic video module 104 described above with respect to FIG. 1. As depicted in FIG. 3, the monoscopic video 301 may include a series of frames 302 (depicted as frames 302a-302d) that may include images of one or more scenes associated with the monoscopic video 301. In the illustrated embodiment, the frames 302a-302c may be associated with a scene 306a of the monoscopic video 301 and the frame 302d may be associated with a different scene, a scene 306b, of the monoscopic video 301.

According to some embodiments of the present disclosure, the stereoscopic video module may be configured to generate modified frames 302a' and 302b' based on movement of one or more elements (not expressly illustrated) between frames 302a and 302b, and 302b and 302c, respectively, similarly to the generation of modified frames 202a' and 202b' described above. For example, the modified frame 302a' may be generated based on movement of one or more elements between the frame 302a and the frame 302b (which may be a subsequent frame of frame 302a). Additionally, the modified frame 302b' may be generated based on movement of one or more elements between the frame 302b and the frame 302c (which may be a subsequent frame of frame 302b).

However, in the illustrated embodiment, the frame 302c may be the last frame associated with the scene 306a of the monoscopic video 301. Therefore, movement of an element associated with the frame 302c may not be present between the frame 302c and subsequent frames of the frame 302c because the subsequent frames, such as the frame 302d, may be associated with a different scene or may not have a substantial degree of movement associated with them before transitioning to another frame. In instances such as this, the stereoscopic video module may be configured to generate an inferred frame that may represent a subsequent frame of the scene had the scene continued past its last frame. For example, in the illustrated embodiment, the stereoscopic video module may be configured to generate an inferred frame 305 that may represent a subsequent frame of the frame 302c of the scene 306a had the scene 306a continued past the frame 302c, which in the illustrated embodiment may be the last frame of the scene 306a.

In some embodiments, the stereoscopic video module may be configured to determine a scene change and may determine the last frame of a scene based on the detected scene change. The stereoscopic video module may also be configured to generate the inferred frame based on detecting the scene change. For example, the stereoscopic video module may be configured to detect the scene change from the scene 306a to the scene 306b, may determine that the frame 302c is the last frame of the scene 306a, and may generate the inferred frame 305 based on detecting the scene change from the scene 306a to the scene 306b.

In some of these embodiments, the stereoscopic video module may be configured to determine the scene change based on an analysis of spatial and/or color distribution of pixels between frames. If the distribution of pixels is substantially similar from one frame to another, the stereoscopic video module may determine that the frames 302 are associated with the same scene 306. However, if the distribution of pixels between frames is substantially different, the stereoscopic video module may determine that a scene change has occurred. For example, the stereoscopic video module may determine that the distribution of pixels between frames 302a, 302b, and 302c is substantially similar to determine that the frames 302a, 302b, and 302c may be part of the scene 306a. The stereoscopic video module may also determine that the distribution of pixels between the frames 302c and 302d is substantially different to determine that a scene change from the scene 306a to the scene 306b occurs between the frames 302c and 302d.

In response to detecting a scene change from a first scene to a second scene, the stereoscopic video module may be configured to detect movement of one or more elements between frames of the first scene. Based on the movement of elements between frames in the first scene, the stereoscopic video module may be configured to generate the inferred frame for the first scene. Upon generating the inferred frame, the stereoscopic video module may be configured to generate a modified frame for the last frame of the first scene based on movement of elements between the last frame of the first scene and the inferred frame.

For example, after detecting the change from scene 306a to scene 306b, the stereoscopic video module may be configured to detect movement of one or more elements between frames 302b and 302c in response to the detection of the scene change. Based on the detected movement between the frames 302b and 302c, the stereoscopic video module may be configured to infer what movement may have occurred between the frame 302c and a subsequent frame in the scene 306a had the scene 306a continued past the frame 302c. In some embodiments, the inference of movement between elements may be made based on an assumption that the movement of elements between frames 302b and 302c would have continued past the frame 302c had the scene 306a not ended after the frame 302c. The stereoscopic video module may accordingly be configured to generate the inferred frame 305 for the scene 306a based on movement of elements between frames 302b and 302c of the scene 306a such that the inferred frame 305 may reflect movement that likely would have continued in the scene 306a had the scene 306a continued past the frame 302c.

Once the inferred frame 305 is generated, the stereoscopic video module may generate a modified frame 302c' based on the movement of one or more elements between the frame 302c and the inferred frame 305, similar to the generation of modified frames 302a' and 302b' based on movement between frames 302a and 302b, and 302b and 302c, respectively. Therefore, the modified frame 302c' may be generated based on movement that may have occurred from the frame 302c to a subsequent frame with substantially the same elements even though such subsequent frame may not exist.

Modifications, additions, or omissions may be made to FIG. 3 without departing from the scope of the present disclosure. For example, the monoscopic video 301 may include more or fewer frames 302 and/or scenes 306 than those explicitly illustrated. Additionally, each scene 306 may include any number of frames 302. Further, in some embodiments, one or more intermediate frames may be included between the frames 302 illustrated.

Returning to FIG. 1, as mentioned previously, the stereoscopic video module 104 may be configured to generate left-eye and right-eye viewing frames of the stereoscopic video 103 based on a camera effect and on modified frames of the monoscopic video 101, which may be generated based on movement of elements between frames, as described above with respect to FIGS. 2 and 3. Accordingly, the stereoscopic video module 104 may also be configured to analyze a camera effect of the monoscopic video 101 in accordance with one or more embodiments of the present disclosure. In such embodiments, the stereoscopic video module 104 may determine whether the camera effect is a panning effect or a zooming effect and may generate the left-eye and right-eye viewing frames based on whether the camera effect is a panning effect or a zooming effect. The generation of the left-eye viewing frame and the right-eye viewing frame based on a determination that the camera effect is a panning effect is discussed in further detail below with respect to FIGS. 4 and 5. The generation of the left-eye viewing frame and the right-eye viewing frame based on a determination that the camera effect is a zooming effect is discussed in further detail below with respect to FIGS. 6 and 7.

Additionally, if the stereoscopic video module 104 determines that the camera effect is not a panning effect or a zooming effect, the stereoscopic video module 104 may generate the left-eye and right-eye viewing frames according to this determination. In some of these embodiments, the stereoscopic video module 104 may generate the left-eye viewing frame and the right-eye viewing frame based on movement of the foreground and the background associated with the frames of the monoscopic video 101. The foreground and background detection is described in greater detail with respect to FIGS. 8 and 9. The generation of the left-eye viewing frame and the right-eye viewing frame based on a determination that the camera effect is not a panning effect or a zooming effect is discussed in further detail below with respect to FIG. 10.

Figure 4:
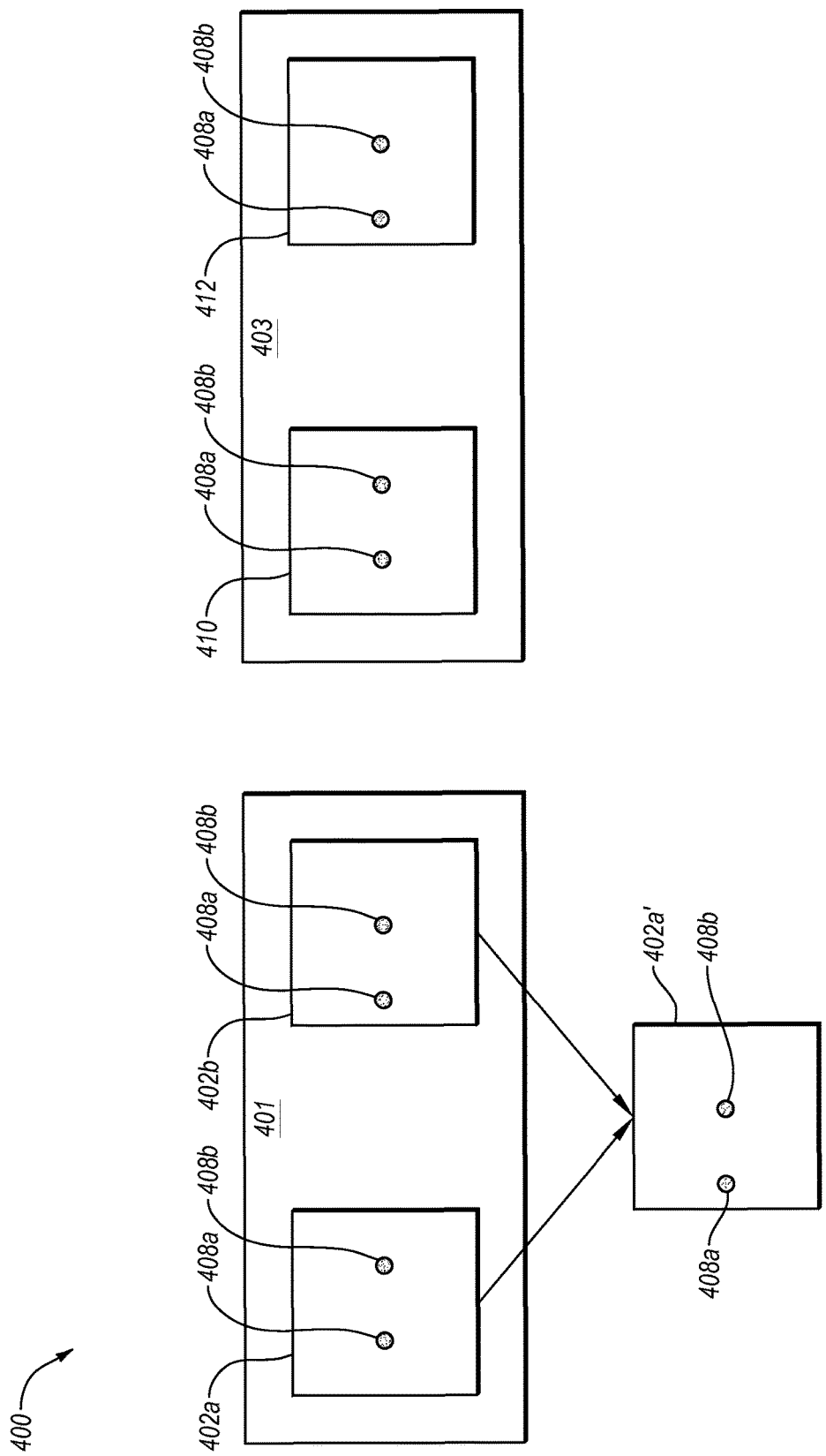
FIG. 4 illustrates an example block diagram depicting the generation of a left-eye viewing frame and a right-eye viewing frame of a stereoscopic video based on a right-panning effect associated with a monoscopic video.

FIG. 4 illustrates an example block diagram 400 depicting the generation of a left-eye viewing frame 410 and a right-eye viewing frame 412 of a stereoscopic video 403 based on a right-panning effect associated with a frame 402a and a frame 402b of a monoscopic video 401, according to some embodiments of the present disclosure. In the illustrated example, the stereoscopic video 403 may be generated by a stereoscopic video module, such as the stereoscopic video module 104 described above with respect to FIG. 1.

The frames 402a and 402b may include one or more elements 408 that may each be included in both the frame 402a and the frame 402b. For example, in the illustrated embodiment, the frames 402a and 402b may each include the elements 408a and 408b. The frames 402a and 402b may also include other elements not expressly depicted in FIG. 4.

When a camera pans, the entire setting being filmed by the camera moves as the camera moves such that the elements within the frames associated with the panning effect may move in a substantially uniform magnitude and direction. For example, the frames 402a and 402b may be associated with a right-panning effect where a camera generating the frames 402a and 402b may have been panned from the left to the right such that the elements 408a and 408b within the frames 402a and 402b may uniformly move in substantially the same amount from the right to the left between the frames 402a and 402b.

The right-panning effect may be generated based on an actual camera panning from left to right, or may be generated based on a simulation of a camera panning from left to right. In some embodiments, the panning effect may be associated with a camera pivoting about an axis, or any suitable simulation of such, to generate the panning effect. In other embodiments, the panning effect may be associated with the entire camera moving in a horizontal direction with respect to the setting being filmed (e.g., from the left to the right), or any suitable simulation of such, to generate the panning effect.

The stereoscopic video module may be configured to determine whether a right-panning effect is present between the frames 402a and 402b based on analyzing the movement of elements, such as the elements 408a and 408b, between the frames 402a and 402b. For example, in some embodiments, the stereoscopic video module may analyze the movement of different elements located in different areas (e.g., the top-right, top-left, bottom-right, and bottom-left areas) of the frames 402a and 402b. In some embodiments, the stereoscopic video module may analyze the movement of the elements by analyzing the movement associated with the pixels of the frames 402a and 402b that may correspond to the elements. In these or other embodiments, the stereoscopic video module may analyze movement associated with each pixel of the frames 402a and 402b to determine the movement of elements between the frame 402a and the frame 402b. If the movement associated with the elements (or in some embodiments the pixels) located in different areas of the frames 402a and 402b all move substantially to the same degree from the right to the left, the stereoscopic video module may determine that the camera effect is a right-panning effect.

The stereoscopic video module may generate a modified frame 402a' associated with the frame 402a based on the determined right-panning effect and the movement associated therewith. For example, as mentioned above, the right-panning effect may result in the elements 408a and 408b moving from the right to the left to substantially the same degree from the frame 402a to the frame 402b. Accordingly, in some embodiments, the stereoscopic video module may generate the modified frame 402a' using the frame 402b because of the difference in horizontal positions of the elements 408a and 408b between the frames 402a and 402b caused by the right-panning effect. In some embodiments, where there may be little to no vertical offset of the elements 408a and 408b between the frames 402a and 402b, the frame 402b may be used as the modified frame 402a'. In other embodiments where a vertical offset may be present in the elements 408a and 408b between the frames 402a and 402b, differences in the vertical positions of the elements 408a and 408b between the frames 402a and 402b may be removed during the generation of the modified frame 402a' such that any vertical offset of the elements 402a and 402b between the frame 402a and the modified frame 402a' may be insubstantial.

The left-eye viewing frame 410 and the right-eye viewing frame 412 of the stereoscopic video 403, which may be associated with the viewing frame 402a of the monoscopic video 401, may be generated based on the right-panning effect, the viewing frame 402a, and the modified viewing frame 402a'. For example, due to the right-panning effect, the frame 402a may be designated as the left-eye viewing frame 410 and the modified frame 402a' may be designated as the right-eye viewing frame 412. Therefore, the left-eye viewing frame 410 and the right-eye viewing frame 412 of the stereoscopic video 403 may be generated based at least partially on the right-panning effect and the modified frame 402a', which may be associated with movement of the elements 408a and 408b between the frames 402a and 402b.

Modifications, additions, or omissions other than those explicitly described may be made to the generation of the stereoscopic video 403. For example, left-eye and right-eye viewing frames associated with other frames 402 of the monoscopic video 401 (e.g., left-eye and right-eye viewing frames associated with the frame 402b) may be generated in a similar manner. Additionally, in some embodiments, left-eye and right-eye viewing frames may be generated for a frame 402 that may be the last, or close to the last, frame of its respective scene such that the modified frame associated with the frame 402 may be generated based on an inferred frame determined in a manner as described above with respect to FIG. 3.

Figure 5:
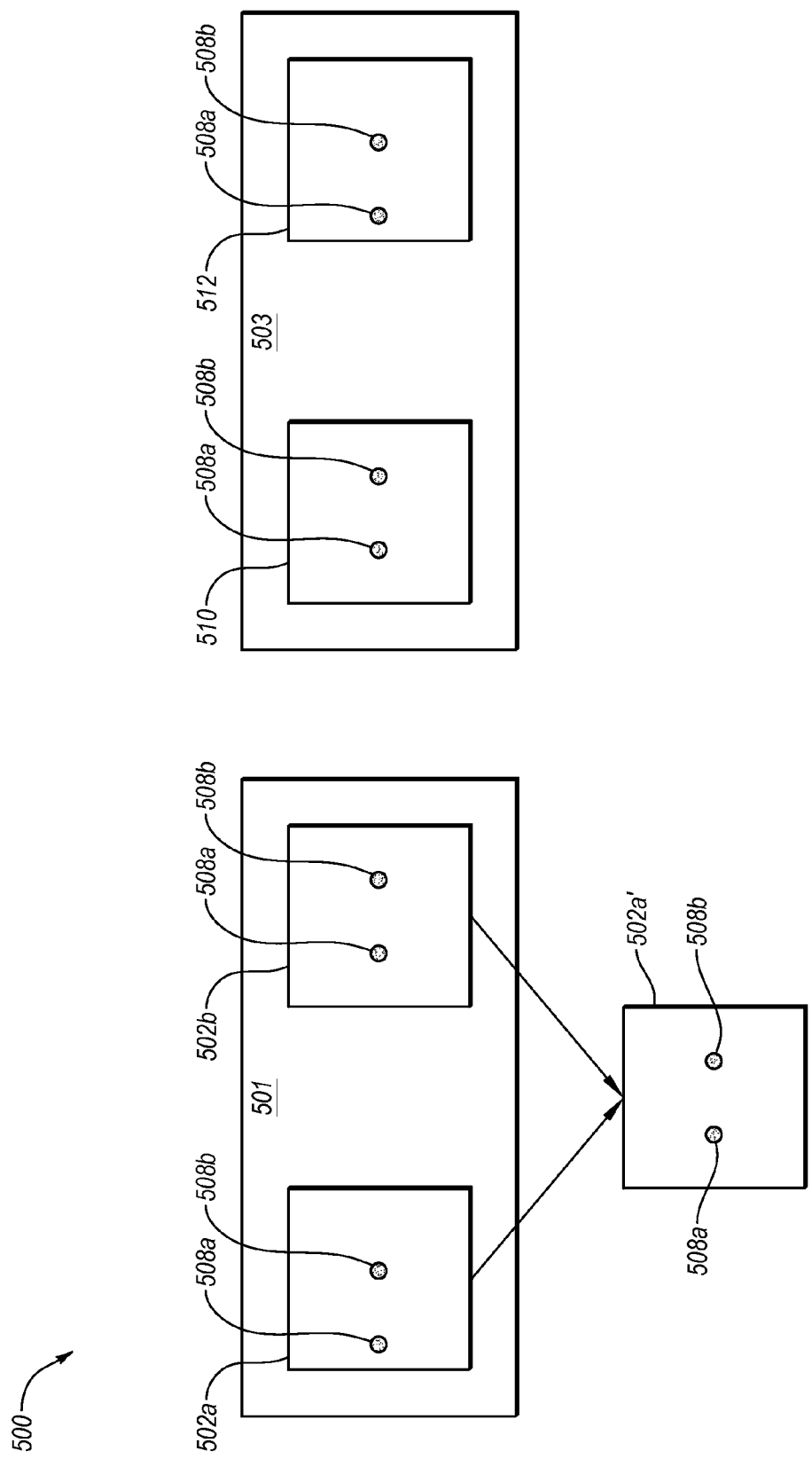
FIG. 5 illustrates an example block diagram depicting the generation of a left-eye viewing frame and a right-eye viewing frame of a stereoscopic video based on a left-panning effect associated with a monoscopic video.

FIG. 5 illustrates an example block diagram 500 depicting the generation of a left-eye viewing frame 510 and a right-eye viewing frame 512 of a stereoscopic video 503 based on a left-panning effect associated with a frame 502a and a frame 502b of a monoscopic video 501, according to some embodiments of the present disclosure. In the illustrated example, the stereoscopic video 503 may be generated by a stereoscopic video module, such as the stereoscopic video module 104 described above with respect to FIG. 1.

The frames 502a and 502b may include one or more elements 508 that may each be included in both the frame 502a and the frame 502b. For example, in the illustrated embodiment, the frames 502a and 502b may each include the elements 508a and 508b.

As mentioned above, the frames 502a and 502b may be associated with a left-panning effect where a camera generating the frames 502a and 502b may have been panned from the right to the left such that the elements 508 within the frames 502a and 502b may uniformly move in substantially the same amount from the left to the right between the frames 502a and 502b. For example, in the illustrated embodiment, the elements 508a and 508b may move from the left to the right between the frames 502a and 502b in substantially the same amount based on the left-panning effect associated with the frames 502a and 502b.

Similar to the right-panning effect, the left-panning effect may be generated based on an actual camera panning from right to left, or may be generated based on a simulation of a camera panning from right to left. Also, in some embodiments, the panning effect may be associated with a camera pivoting about an axis, or any suitable simulation of such, to generate the panning effect. In other embodiments, the panning effect may be associated with the entire camera moving in a horizontal direction with respect to the setting being filmed (e.g., from the right to the left), or any suitable simulation of such, to generate the panning effect.

Similar to determining whether a right-panning effect is present, as discussed above with respect to FIG. 4, the stereoscopic video module may be configured to determine whether a left-panning effect is present between the frames 502a and 502b based on analyzing the movement associated with elements, such as the elements 508a and 508b, (or in some embodiments the pixels) between the frames 502a and 502b. If the movement associated with elements (or in some embodiments the pixels) located in different areas of the frames 502a and 502b all move substantially to the same degree from the left to the right, the stereoscopic video module may determine that the camera effect is a left-panning effect.

The stereoscopic video module may generate a modified frame 502a' associated with the frame 502a based on the determined left-panning effect and the movement associated therewith. For example, as mentioned above, the left-panning effect may result in the elements 508a and 508b moving from the left to the right to substantially the same degree from the frame 502a to the frame 502b. Accordingly, in some embodiments, the stereoscopic video module may generate the modified frame 502a' based on the frame 502b because of the difference in horizontal positions of the elements 508a and 508b between the frames 502a and 502b caused by the left-panning effect. In some embodiments, where there may be little to no vertical offset of the elements 508a and 508b between the frames 502a and 502b, the frame 502b may be used as the modified frame 502a'. In other embodiments where a vertical offset may be present in the elements 508a and 508b between the frames 502a and 502b, differences in the vertical positions of the elements 508a and 508b between the frames 502a and 502b may be removed during the generation of the modified frame 502a' such that any vertical offset of the elements 508a and 508b between the frame 502a and the modified frame 502a' may be insubstantial.

The left-eye viewing frame 510 and the right-eye viewing frame 512 of the stereoscopic video 503, which may be associated with the viewing frame 502a of the monoscopic video 501, may be generated based on the left-panning effect, the viewing frame 502a, and the modified viewing frame 502a'. For example, due to the left-panning effect, the modified frame 502a' may be designated as the left-eye viewing frame 510 and the frame 502a may be designated as the right-eye viewing frame 512. Therefore, the left-eye viewing frame 510 and the right-eye viewing frame 512 of the stereoscopic video 503 may be generated based at least partially on the left-panning effect and the modified frame 502a', which may be associated with movement of the elements 508a and 508b between the frames 502a and 502b.

Modifications, additions, or omissions other than those explicitly described may be made to the generation of the stereoscopic video 503. For example, left-eye and right-eye viewing frames associated with other frames 502 of the monoscopic video 501 (e.g., left-eye and right-eye viewing frames associated with the frame 502b) may be generated in a similar manner. Additionally, in some embodiments, left-eye and right-eye viewing frames may be generated for a frame 502 that may be the last, or close to the last, frame of its respective scene such that the modified frame associated with the frame 502 may be generated based on an inferred frame generated in a manner as described above with respect to FIG. 3.

Figure 6:
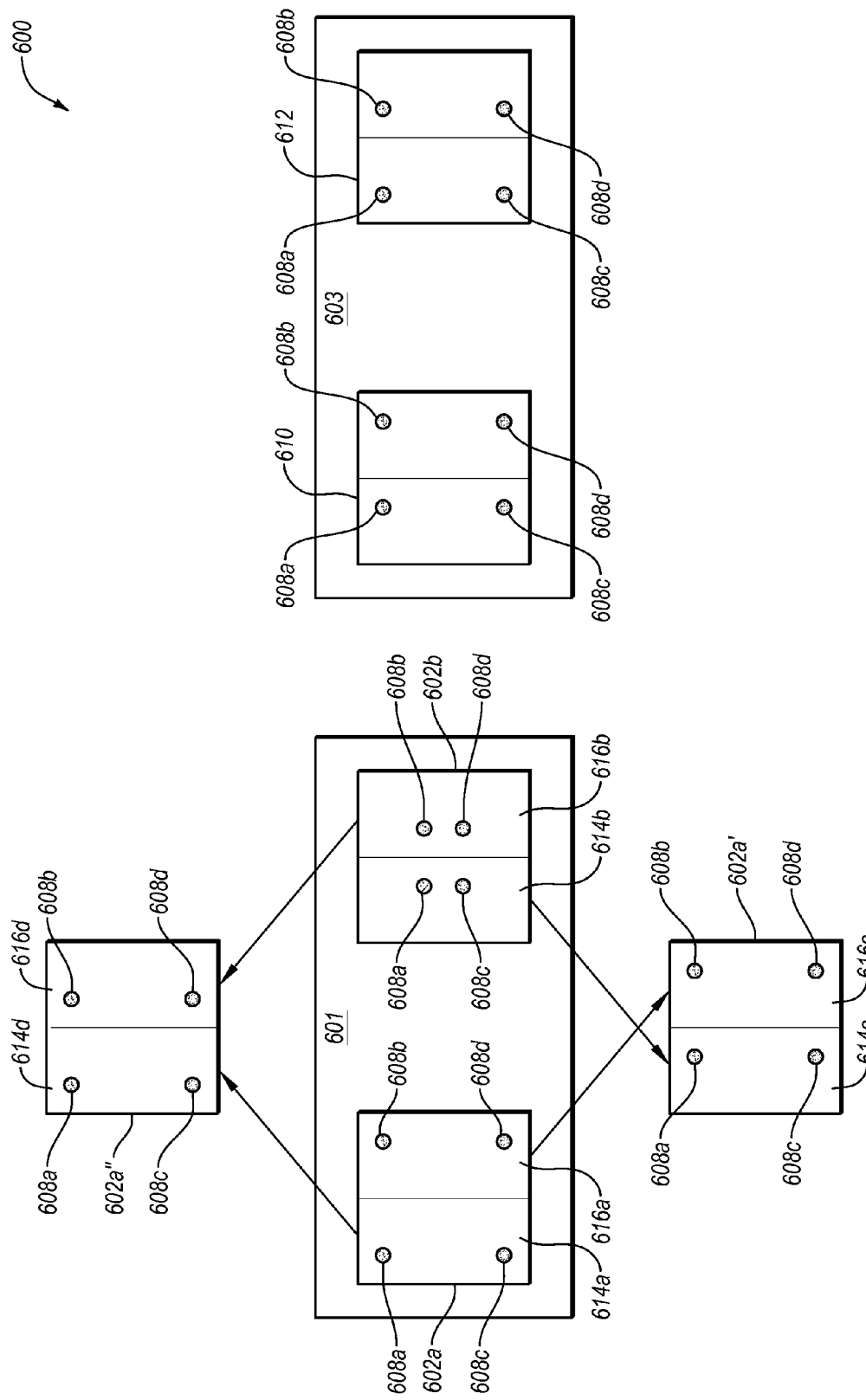
FIG. 6 illustrates an example block diagram depicting the generation of a left-eye viewing frame and a right-eye viewing frame of a stereoscopic video based on a zooming-out camera effect associated with a monoscopic video.

FIG. 6 illustrates an example block diagram 600 depicting the generation of a left-eye viewing frame 610 and a right-eye viewing frame 612 of a stereoscopic video 603 based on a zooming-out camera effect associated with a frame 602a and a frame 602b of a monoscopic video 601, according to some embodiments of the present disclosure. In the illustrated example, the stereoscopic video 603 may be generated by a stereoscopic video module, such as the stereoscopic video module 104 described above with respect to FIG. 1.

The frames 602a and 602b may include one or more elements 608 that may each be included in both the frame 602a and the frame 602b. For example, in the illustrated embodiment, the frames 602a and 602b may each include the elements 608a, 608b, 608c, and 608d.

When a camera zooms out, the elements within the frames being generated by the camera may move toward the center of the setting captured by the frames from one frame to another. For example, the frames 602a and 602b may be associated with a zooming-out camera effect such that the elements 608a, 608b, 608c, and 608d within the frames 602a and 602b may move toward the center of the setting captured by the frames 602a and 602b from the frame 602a to the frame 602b, as illustrated in FIG. 6. The zooming-out camera effect may be generated based on an actual camera zooming out, or may be generated based on a simulation of zooming out.

Similar to determining whether a right-panning or left-panning effect is present, as discussed above with respect to FIGS. 4 and 5, the stereoscopic video module may be configured to determine whether a zooming-out camera effect is present between the frames 602a and 602b based on analyzing the movement between the frames 602a and 602b of elements located in different areas (e.g., the top-left, top-right, bottom-left, and bottom-right areas) of the frames 602a and 602b, such as the elements 608a, 608b, 608c, and 608d, which may be located in the top-left, top-right, bottom-left, and bottom-right areas, respectively, of the frames 602a and 602b. In some embodiments, the stereoscopic video module may analyze the movement of the elements by analyzing the movement associated with the pixels of the frames 602a and 602b that may correspond to the elements. In these or other embodiments, the stereoscopic video module may analyze movement associated with each pixel of the frames 602a and 602b to determine the movement of elements between the frame 602a and the frame 602b. If the movement associated with the elements (or in some embodiments the pixels) located in different areas of the frames 602a and 602b all move substantially toward the center of the setting captured by the frames 602a and 602b, the stereoscopic video module may determine that the camera effect is a zooming-out camera effect.

The stereoscopic video module may generate a modified frame 602a' and a modified frame 602a" associated with the frame 602a based on the determined zooming-out camera effect and the movement associated therewith. For example, the zooming-out camera effect may result in the elements included in left sides 614a and 614b of the frames 602a and 602b, respectively, (e.g., the elements 608a and 608c) moving from the left to the right to substantially the same degree from the frame 602a to the frame 602b. Additionally, the zooming-out camera effect may result in the elements included in right sides 616a and 616b of the frames 602a and 602b, respectively, (e.g., the elements 608b and 608d) moving from the right to the left to substantially the same degree from the frame 602a to the frame 602b.

In some embodiments, the stereoscopic video module may generate a left side 614c of the modified frame 602a' based on the horizontal offset of the elements between the left sides 614a and 614b of the frames 602a and 602b, respectively. Additionally, the stereoscopic video module may ignore any vertical offset of the elements between the left sides 614a and 614b during the generation of the left side 614c. For example, the elements 608a and 608c may have substantially the same horizontal position in the left side 614c of the modified frame 602a' as in the left side 614b of the frame 602b. However, the elements 608a and 608c may have substantially the same vertical position in the left side 614c of the modified frame 602a' as in the left side 614a of the frame 602a.

Additionally, the stereoscopic video module may generate a right side 616c of the modified frame 602a' based on both the horizontal and vertical positions of the elements included in the right side 616a of the frame 602a such that the right side 616c may be substantially similar to the right side 616a. For example, the elements 608b and 608d may have substantially the same horizontal and vertical positions in the right side 616c of the modified frame 602a' as in the right side 616a of the frame 602a.

The stereoscopic video module may also generate a right side 616d of the modified frame 602a" based on the horizontal offset of the elements between the right sides 616a and 616b of the frames 602a and 602b, respectively. Additionally, the stereoscopic video module may ignore any vertical offset of the elements between the right sides 616a and 616b during the generation of the right side 616d. For example, the elements 608b and 608d may have substantially the same horizontal position in the right side 616d of the modified frame 602a" as in the right side 616b of the frame 602b. However, the elements 608b and 608d may have substantially the same vertical position in the right side 616d of the modified frame 602a" as in the right side 616a of the frame 602a.

In contrast, the stereoscopic video module may generate a left side 614d of the modified frame 602a" based on both the horizontal and vertical positions of the elements included in the left side 614a of the frame 602a such that the left side 614d may be substantially similar to the left side 614a. For example, the elements 608a and 608c may have substantially the same horizontal and vertical positions in the left side 614d of the modified frame 602a" as in the left side 614a of the frame 602a.

As depicted in FIG. 6, the configuration of the modified frames 602a' and 602a" for a zooming-out effect described above may result in the elements 608a, 608b, 608c, and 608d being horizontally offset to the right in the modified frame 602a' with respect to the modified frame 602a". Additionally, the elements 608a, 608b, 608c, and 608d may have little to no vertical offset in the modified frame 602a' with respect to the modified frame 602a".

The left-eye viewing frame 610 and the right-eye viewing frame 612 of the stereoscopic video 603, which may be associated with the viewing frame 602a of the monoscopic video 601, may be generated based on the zooming-out camera effect and the modified viewing frames 602a' and 602a". For example, due to the zooming-out camera effect, the modified frame 602a' may be designated as the left-eye viewing frame 610 and the modified frame 602a" may be designated as the right-eye viewing frame 612. Therefore, the left-eye viewing frame 610 and the right-eye viewing frame 612 of the stereoscopic video 603 may be generated based at least partially on the zooming-out camera effect and the modified frames 602a' and 602a", which may be associated with movement of the elements 608a, 608b, 608c, and 608d between the frames 602a and 602b.

Modifications, additions, or omissions other than those explicitly described may be made to the generation of the stereoscopic video 603. For example, left-eye and right-eye viewing frames associated with other frames 602 of the monoscopic video 601 (e.g., left-eye and right-eye viewing frames associated with the frame 602b) may also be generated in a similar manner. Additionally, in some embodiments, left-eye and right-eye viewing frames may be generated for a frame 602 that may be the last, or close to the last, frame of its respective scene such that the modified frames associated with the frame 602 may be generated based on the frame 602 and an associated inferred frame generated in a manner as described above with respect to FIG. 3.

Figure 7:
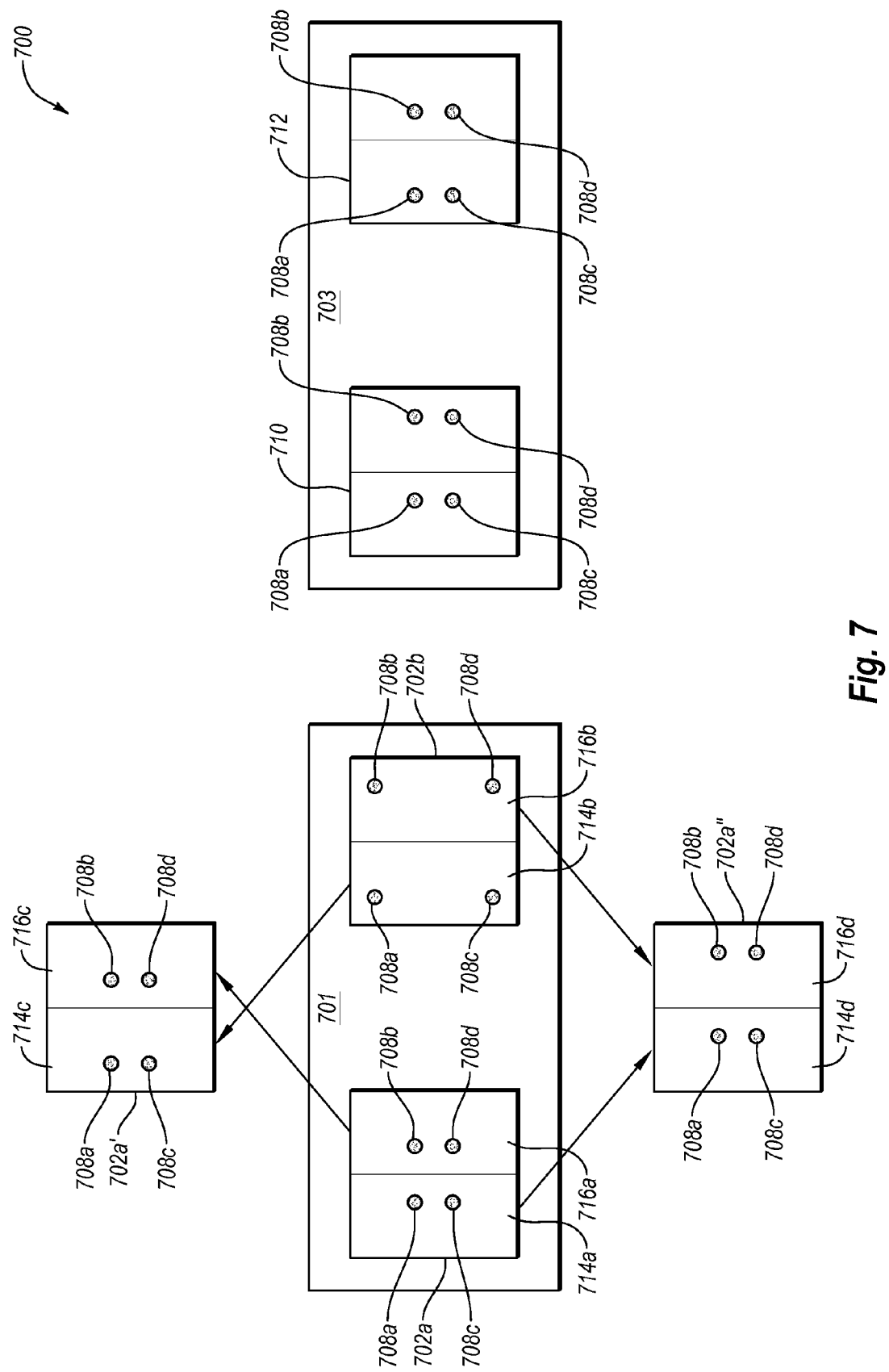
FIG. 7 illustrates an example block diagram depicting the generation of a left-eye viewing frame and a right-eye viewing frame of a stereoscopic video based on a zooming-in camera effect associated with a monoscopic video.

FIG. 7 illustrates an example block diagram 700 depicting the generation of a left-eye viewing frame 710 and a right-eye viewing frame 712 of a zooming-in camera effect associated with a frame 702a and a frame 702b of a monoscopic video 701, according to some embodiments of the present disclosure. The frames 702a and 702b may include one or more elements 708 that may each be included in both the frame 702a and the frame 702b. For example, in the illustrated embodiment, the frames 702a and 702b may each include the elements 708a, 708b, 708c, and 708d.

When a camera zooms in, the elements within the frames being generated by the camera may move away from the center of the setting captured by the frames from one frame to another. For example, the frames 702a and 702b may be associated with a zooming-in camera effect such that the elements 708a, 708b, 708c, and 708d within the frames 702a and 702b may move away from the center of the setting captured by the frames 702a and 702b from the frame 702a to the frame 702b, as illustrated in FIG. 7. The zooming-in camera effect may be generated based on an actual camera zooming in, or may be generated based on a simulation of a zooming in.

Similar to determining whether a right-panning, left-panning, or zooming-out camera effect is present, as discussed above with respect to FIGS. 4-6, the stereoscopic video module may be configured to determine whether a zooming-in camera effect is present between the frames 702a and 702b based on analyzing the movement between the frames 702a and 702b of elements located in different areas (e.g., the top-right, top-left, bottom-right, and bottom-left areas) of the frames 702a and 702b, such as the elements 708a, 708b, 708c, and 708d. In some embodiments, the stereoscopic video module may analyze the movement of the elements by analyzing the movement associated with the pixels of the frames 702a and 702b that may correspond to the elements. In these or other embodiments, the stereoscopic video module may analyze movement associated with each pixel of the frames 702a and 702b to determine the movement of elements between the frame 702a and the frame 702b. If the movement associated with the elements (or in some embodiments the pixels) located in different areas of the frames 702a and 702b all move substantially away from the center of the setting captured by the frames 702a and 702b, the stereoscopic video module may determine that the camera effect is a zooming-in camera effect.

The stereoscopic video module may generate a modified frame 702a' and a modified frame 702a" associated with the frame 702a based on the determined zooming-in camera effect and the movement associated therewith. For example, the zooming-in camera effect may result in the elements included in left sides 714a and 714b of the frames 702a and 702b, respectively, (e.g., the elements 708a and 708c) moving from the right to the left to substantially the same degree from the frame 702a to the frame 702b. Additionally, the zooming-in camera effect may result in the elements included in the right sides 716a and 716b of the frames 702a and 702b, respectively, (e.g., the elements 708b and 708d) moving from the left to the right to substantially the same degree from the frame 702a to the frame 702b.

In some embodiments, the stereoscopic video module may generate a left side 714c of the modified frame 702a' based on the horizontal offset of the elements between the left sides 714a and 714b of the frames 702a and 702b, respectively. Additionally, the stereoscopic video module may ignore any vertical offset of the elements between the left sides 714a and 714b during the generation of the left side 714c. For example, the elements 708a and 708c may have substantially the same horizontal position in the left side 714c of the modified frame 702a' as in the left side 714b of the frame 702b. However, the elements 708a and 708c may have substantially the same vertical position in the left side 714c of the modified frame 702a' as in the left side 714a of the frame 702a.

Additionally, the stereoscopic video module may generate a right side 716c of the modified frame 702a' based on both the horizontal and vertical positions of the elements included in the right side 716a of the frame 702a such that the right side 716c may be substantially similar to the right side 716a. For example, the elements 708b and 708d may have substantially the same horizontal and vertical positions in the right side 716c of the modified frame 702a' as in the right side 716a of the frame 702a.

The stereoscopic video module may also generate a right side 716d of the modified frame 702a" based on the horizontal offset of the elements between the right sides 716a and 716b of the frames 702a and 702b, respectively. Additionally, the stereoscopic video module may ignore any vertical offset of the elements between the right sides 716a and 716b during the generation of the right side 716d. For example, the elements 708b and 708d may have substantially the same horizontal position in the right side 716d of the modified frame 702a" as in the right side 716b of the frame 702b. However, the elements 708b and 708d may have substantially the same vertical position in the right side 716d of the modified frame 702a" as in the right side 716a of the frame 702a.

Further, the stereoscopic video module may generate a left side 714d of the modified frame 702a" based on both the horizontal and vertical positions of the elements included in the left side 714a of the frame 702a such that the left side 714d may be substantially similar to the left side 714a. For example, the elements 708a and 708c may have substantially the same horizontal and vertical positions in the left side 714d of the modified frame 702a" as in the left side 714a of the frame 702a.

As depicted in FIG. 7, the configuration of the modified frames 702a' and 702a" for a zooming-in effect described above may result in the elements 708a, 708b, 708c, and 708d being horizontally offset to the left in the modified frame 702a' with respect to the modified frame 702a". Additionally, the elements 708a, 708b, 708c, and 708d may have little to no vertical offset in the modified frame 702a' with respect to the modified frame 702a".

The left-eye viewing frame 710 and the right-eye viewing frame 712 of the stereoscopic video 703, which may be associated with the viewing frame 702a of the monoscopic video 701, may be generated based on the zooming-in camera effect and the modified viewing frames 702a' and 702a". For example, due to the zooming-in camera effect, the modified frame 702a" may be designated as the left-eye viewing frame 710 and the modified frame 702a' may be designated as the right-eye viewing frame 712. Therefore, the left-eye viewing frame 710 and the right-eye viewing frame 712 of the stereoscopic video 703 may be generated based at least partially on the zooming-in camera effect and the modified frames 702a' and 702a", which may be associated with movement of the elements 708a, 708b, 708c, and 708d between the frames 702a and 702b.

Modifications, additions, or omissions other than those explicitly described may be made to the generation of the stereoscopic video 703. For example, left-eye and right-eye viewing frames associated with other frames 702 of the monoscopic video 701 (e.g., left-eye and right-eye viewing frames associated with the frame 702*b*) may also be generated in a similar manner. Additionally, in some embodiments, left-eye and right-eye viewing frames may be generated for a frame 702 that may be the last, or close to the last, frame of its respective scene such that the modified frames associated with the frame 702 may be generated based on the frame 702 and a corresponding inferred frame generated in a manner as described above with respect to FIG. 3.

Returning to FIG. 1, the stereoscopic video module 104 may accordingly be configured to generate left-eye and right-eye viewing frames for the stereoscopic video 103 based on panning or zooming effects as described above with respect to FIGS. 4-7. However, in some instances a camera effect may be something different from a panning or zooming effect. For example, the camera effect may be a rotating camera effect or a stationary camera effect. In such instances, the stereoscopic video module 104 may determine that the camera effect is not a panning or zooming effect and may generate the left-eye and right-eye viewing frames according to this determination. In some of these embodiments, the stereoscopic video module 104 may generate the left-eye viewing frame and the right-eye viewing frame based on the determination that the camera effect is not a panning or zooming effect and based on movement of the foreground and/or the background associated with the frames of the monoscopic video 101.

Accordingly, in some embodiments, the stereoscopic video module 104 may be configured to determine at least one of the foreground and the background associated with the monoscopic video 101 such that the stereoscopic video module may analyze movement associated with the foreground and/or the background. In some of these embodiments, the stereoscopic video module 104 may be configured to determine, based on frames of the monoscopic video 101, a fastest-moving element, a slow-moving element, and/or a dominant element associated with the frames of the monoscopic video 101 to determine the foreground and/or background.

FIG. 8 illustrates example frames 802*a* and 802*b* of a monoscopic video 801 where the frames 802*a* and 802*b* include a fastest-moving element 820, a slow-moving element 822 and a dominant element 824, in accordance with some embodiments of the present disclosure. The monoscopic video 801 may be substantially similar to the monoscopic video 101 of FIG. 1. In the illustrated embodiment, the frames 802*a* and 802*b* may be associated with the same scene of the monoscopic video 801 and the frame 802*b* may be a subsequent frame of the frame 802*a*. A stereoscopic video module, such as the stereoscopic video module 104 of FIG. 1, may be configured to identify the fastest-moving element 820, the slow-moving element 822, and/or the dominant element 824.

The stereoscopic video module may analyze the frames 802*a* and 802*b* to determine the fastest-moving element 820, the slow-moving element 822, and/or the dominant element 824. For example, the stereoscopic video module may analyze the displacement of elements in the frame 802*b* with respect to the frame 802*a* to identify the fastest-moving element 820 and the slow-moving element 822. A fast-moving element may move a further distance than a slow-moving element from the frame 802*a* to the frame 802*b*. Therefore, the stereoscopic video module may analyze the displacement of elements from the frame 802*a* to the frame 802*b*, and the element with the greatest amount of displacement may be determined to be the fastest-moving element.

In the illustrated embodiment, the fastest-moving element 820 may have the largest displacement from the frame 802*a* to the frame 802*b* such that the stereoscopic video module may identify the fastest-moving element 820 as the fastest-moving element from the frame 802*a* to the frame 802*b*. Additionally, as illustrated in FIG. 8, the slow-moving element 822 may also move between the frame 802*a* to the frame 802*b*, but to a smaller degree than the fastest-moving element 820. Accordingly, the stereoscopic video module may identify the slow-moving element 822 as a slower-moving element than the fastest-moving element 820.

Additionally, the stereoscopic video module may be configured to determine that the dominant element 824 is a dominant element within the frames 802*a* and 802*b*. In some embodiments, the stereoscopic video module may identify elements within the frames 802*a* and 802*b* based on an analysis of the pixels associated with the frames 802*a* and 802*b* such that the number of pixels associated with a particular element may be determined. Accordingly, in some embodiments, the stereoscopic video module may be configured to identify the dominant element 824 based on the dominant element 824 being associated with a substantially higher number of pixels than other elements included in the frames 802*a* and 802*b*. Therefore, by analyzing the frames 802*a* and 802*b*, the stereoscopic video module may be able to identify the fastest-moving element 820, the slow-moving element 822, and/or the dominant element 824. As detailed below, identification of these elements may help in a determination of the foreground and/or background associated with the frames 802*a* and 802*b*.

The illustration of FIG. 8 is merely to introduce the concepts behind a fastest-moving element, a slow-moving element and a dominant element. Accordingly, modifications, additions, or omissions may be made to FIG. 8 without departing from the scope of the present disclosure. In some embodiments, the amount of displacement between the frames 802*a* and 802*b* of the fastest-moving element 820 and the slow-moving element 822 may vary based on differences in speed of the fastest-moving element 820 and the slow-moving element 822. For example, in some instances, the fastest-moving element 820 and the slow-moving element 822 may move at substantially the same speed such that the displacement between the frames 802*a* and 802*b* of the fastest-moving element 820 and the slow-moving element 822 may be substantially the same. Additionally, in some embodiments, the dominant element 824 may move between the frames 802*a* and 802*b*, while in other embodiments, the dominant element 824 may not move. Further, in some instances, the frames 802*a* and 802*b* may not include a dominant element. Also, the direction of movement of the fastest-moving element 820, the slow-moving element 822, and/or the dominant element 824 may vary.

Figure 9:
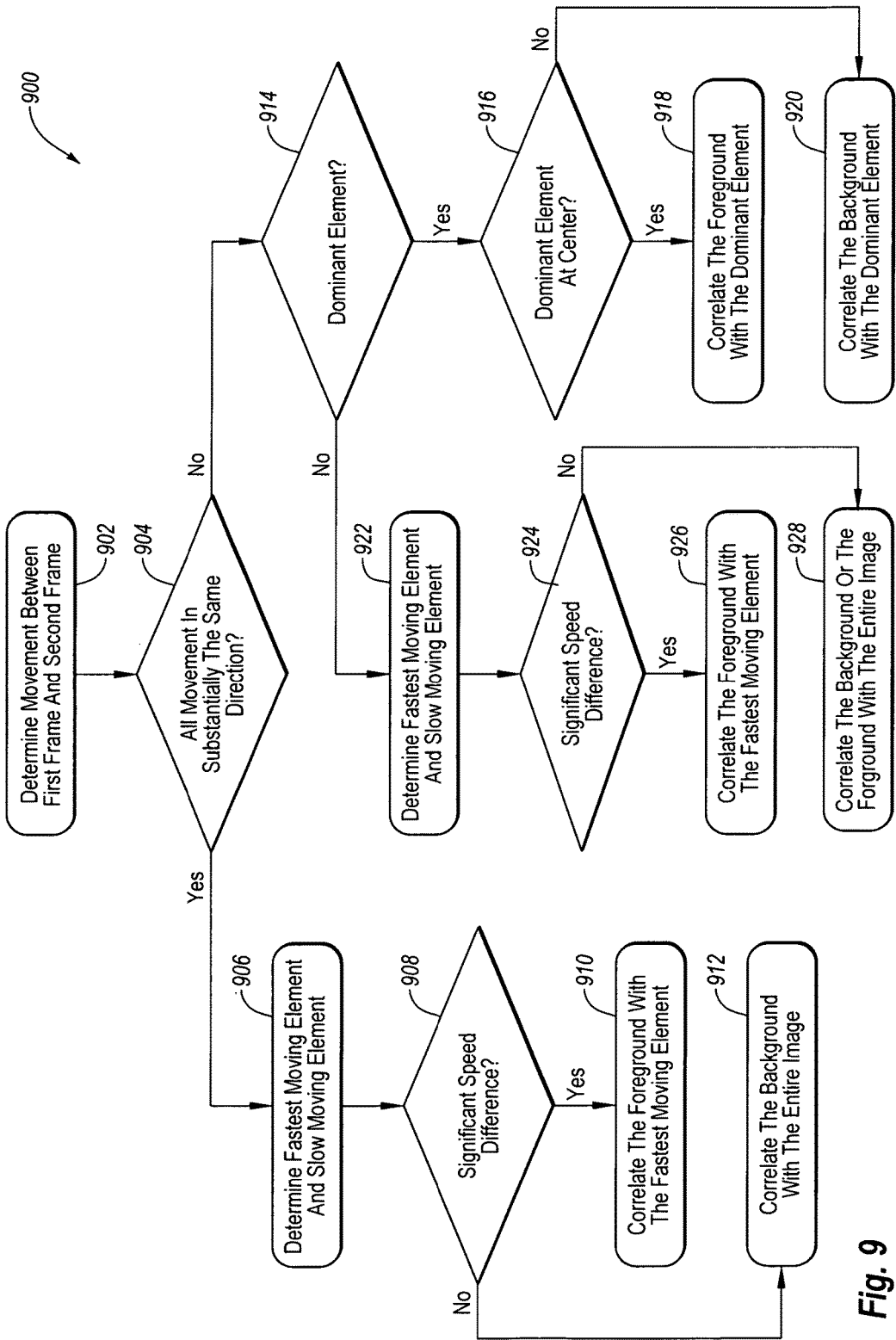
FIG. 9 is a flowchart of an example method of determining the foreground and/or background of a scene based on at least one of a fastest-moving element, a slow-moving element, and a dominant element associated with the scene.

As mentioned above, the foreground and/or background of a scene may be determined based on a fastest-moving element, a slow-moving element, and/or a dominant element associated with the scene. FIG. 9 is a flowchart of an example method 900 of determining the foreground and/or background of a scene based on at least one of a fastest-moving element, a slow-moving element and a dominant element associated with the scene, according to some embodiments of the present disclosure. The method 900 may be implemented, in some embodiments, by a stereoscopic video module, such as the stereoscopic video module 104 of FIG. 1. For instance, the stereoscopic video module 104 may be configured to execute computer instructions to perform operations for determining the foreground and/or the background as represented by one or more of the blocks of the method 900. Although illustrated as discrete blocks, various blocks may be divided into additional blocks, combined into fewer blocks, or eliminated, depending on the desired implementation.

The method 900 may begin at block 902 where movement of elements and/or pixels between a first frame and a second frame may be determined. At block 904, it may be determined whether all the elements and/or pixels are moving in substantially the same direction. If all the elements and/or pixels are moving in substantially the same direction, the method 900 may proceed to block 906. If all the elements and/or pixels are not moving in substantially the same direction, the method 900 may proceed to block 914.

At block 906, a fastest-moving element and a slow-moving element associated with the first frame and the second frame may be determined. In some embodiments, the fastest-moving element and the slow-moving element may be determined based on the displacement of elements in the second frame with respect to the first frame such as described above with respect to the fastest-moving element 820 and the slow-moving element 822 between frames 802*a* and 802*b* of FIG. 8.

At block 908, it may be determined whether there is a significant speed difference between the fastest-moving element and the slow moving element. If there is a significant speed difference, the method 900 may proceed to block 910. If there is not a significant speed difference, the method 900 may proceed to block 912. In some embodiments, the speed difference may be determined by measuring the difference in the offsets of the fastest-moving element and the slow-moving element from the first frame to the second frame. Additionally, in some embodiments, the speed difference (e.g., difference in offset) may be compared to a threshold and if the speed difference is greater than the threshold, the method 900 may proceed to block 910 and if the speed difference is less than the threshold, the method 900 may proceed to block 912. In some instances, the threshold may vary according to the type of movie. For example, the threshold may be higher for an action movie than for a drama.

At block 910, with the speed difference between the fastest-moving element and the slow-moving element being substantially large enough (e.g., greater than the threshold), the foreground may be correlated with the fastest-moving element such that the fastest-moving element may be considered to be in the foreground. At block 912, with the speed difference between the fastest-moving element and the slow-moving element not being substantially large enough (e.g., less than the threshold), the background may be correlated with the entire scene associated with the first frame and the second frame. Therefore, at block 912, the entire scene associated with the first frame and the second frame may be considered to be in the background.

Returning to block 904, as mentioned above, if the movement of all the elements and/or pixels are not the same, the method 900 may proceed to block 914. At block 914, it may be determined whether a dominant element is present in the scene associated with the first and second frames. In some embodiments, the determination of whether or not a dominant element is present may be determined based on the number of pixels associated with each element, such as described above with respect to the dominant element 824 of FIG. 8. If a dominant element is present, the method 900 may proceed to block 916. If a dominant element is not present, the method 900 may proceed to block 922.

At block 916, it may be determined whether or not the dominant element determined in block 914 is substantially at the center of the scene associated with the first and second frames. If the dominant element is substantially at the center, the method 900 may proceed to block 918. If the dominant element is not substantially at the center, the method 900 may proceed to block 920.

At block 918, with the dominant element substantially at the center of the scene, the foreground may be correlated with the dominant element such that the dominant element may be considered the foreground. At block 920, with the dominant element not substantially at the center of the scene, the background may be correlated with the dominant element such that the dominant element may be considered the background.

Returning to block 914, if it is determined that no dominant element is present, the method 900 may proceed to block 922, as mentioned above. At block 922, a fastest-moving element and a slow-moving element associated with the first frame and the second frame may be determined, similar to as done in block 906. At block 924, it may be determined whether there is a significant speed difference between the fastest-moving element and the slow-moving element, similar to as done in block 908. If there is a significant speed difference, the method 900 may proceed to block 926. If there is not a significant speed difference, the method 900 may proceed to block 928.

At block 926, with the speed difference between the fastest-moving element and the slow-moving element being substantially large enough, the foreground may be correlated with the fastest-moving element such that the fastest-moving element may be considered to be in the foreground. At block 928, with the speed difference between the fastest-moving element and the slow-moving element not being substantially large enough, the background or the foreground may be correlated with the entire scene associated with the first frame and the second. Therefore, at block 928, the entire scene associated with the first frame and the second frame may be considered to be in the background or the foreground.

Therefore, the method 900 may be used to determine the background and/or the foreground of a scene. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Returning to FIG. 1, as mentioned above, in some embodiments where the stereoscopic video module 104 may determine that a camera effect is not a panning or zooming effect, the stereoscopic video module 104 may generate the left-eye viewing frame and the right-eye viewing frame based on movement of the foreground and/or the background associated with the frames of the monoscopic video 101.

FIG. 10 illustrates an example block diagram 1000 for generating a left-eye viewing frame 1010 and a right-eye viewing frame 1012 of a stereoscopic video 1003 from a monoscopic video 1001 based on movement of the foreground and/or background associated with the monoscopic video 1001, according to some embodiments described herein. The left-eye viewing frame 1010 and the right-eye viewing frame 1012 may be generated by a stereoscopic video module, such as the stereoscopic video module 104 of FIG. 1. The left-eye viewing frame 1010 and the right-eye viewing frame 1012 of the stereoscopic video 1003 may correspond to the frame 1002a of the monoscopic video 1001 and may be generated based on the frame 1002a and its associated modified frame 1002a'. In the illustrated embodiment, the modified frame 1002a' may be generated based on movement between frames 1002a and 1002b in a manner such as described above with respect to FIG. 2; however, in other embodiments, the modified frame 1002a' may be generated using an inferred frame in a manner as described above with respect to FIG. 3.

In the illustrated embodiment, the stereoscopic video module may also generate the left-eye viewing frame 1010 and the right-eye viewing frame 1012 based on a determination that a camera effect associated with the frames 1002a and 1002b is not a panning or zooming effect and based on relative movement of the background and foreground associated with the frames 1002a and 1002b (and consequently based on the modified frame 1002a' also). In some embodiments, the stereoscopic video module may determine the background and foreground using the method 900 described above with respect to FIG. 9. In other embodiments, the background and foreground may be determined in any other suitable manner.

For example, in some instances the foreground may be moving faster than the background between the frames 1002a and 1002b, and the stereoscopic video module may determine as such. In such instances, if the foreground is moving to the right, and regardless of which direction the background may be moving, the stereoscopic video module may designate the frame 1002a as the left-eye viewing frame 1010 and may designate the modified frame 1002a' as the right-eye viewing frame 1012. Additionally, in such instances, if the foreground is moving to the left, and regardless of which direction the background may be moving, the stereoscopic video module may designate the modified frame 1002a' as the left-eye viewing frame 1010 and may designate the frame 1002a as the right-eye viewing frame 1012.

In other instances, the background may be moving faster than the foreground between the frames 1002a and 1002b, and the stereoscopic video module may determine as such. In such instances, if the background is moving to the left, and regardless of which direction the foreground may be moving, the stereoscopic video module may designate the frame 1002a as the left-eye viewing frame 1010 and may designate the modified frame 1002a' as the right-eye viewing frame 1012. Additionally, in such instances, if the background is moving to the right, and regardless of which direction the foreground may be moving, the stereoscopic video module may designate the modified frame 1002a' as the left-eye viewing frame 1010 and may designate the frame 1002a as the right-eye viewing frame 1012.

Accordingly, the stereoscopic video module may be configured to generate the left-eye viewing frame 1010 and the right-eye viewing frame 1012 based on relative movement of the background and foreground associated with the frames 1002a and 1002b (and consequently based on the modified frame 1002a' also) in accordance with a determination that a camera effect associated with the frames 1002a and 1002b is not a panning or zooming effect.

Modifications, additions, or omissions may be made to FIG. 10 without departing from the scope of the present disclosure. For example, as mentioned above, in the illustrated embodiment, the frame 1002b may be subsequent to the frame 1002a and the modified frame 1002a' may be generated based on movement between the frames 1002a and 1002b. However, in some instances, such as where a modified frame is being generated for the last, or close to last, frame of a particular scene, the modified frame of such an instance may be generated based on an inferred frame as described above with respect to FIG. 3. Additionally, the foreground and background may be detected according to the method 900 of FIG. 9 in some embodiments, and in other embodiments, the foreground and background may be detected in some other acceptable manner.

Figure 11:
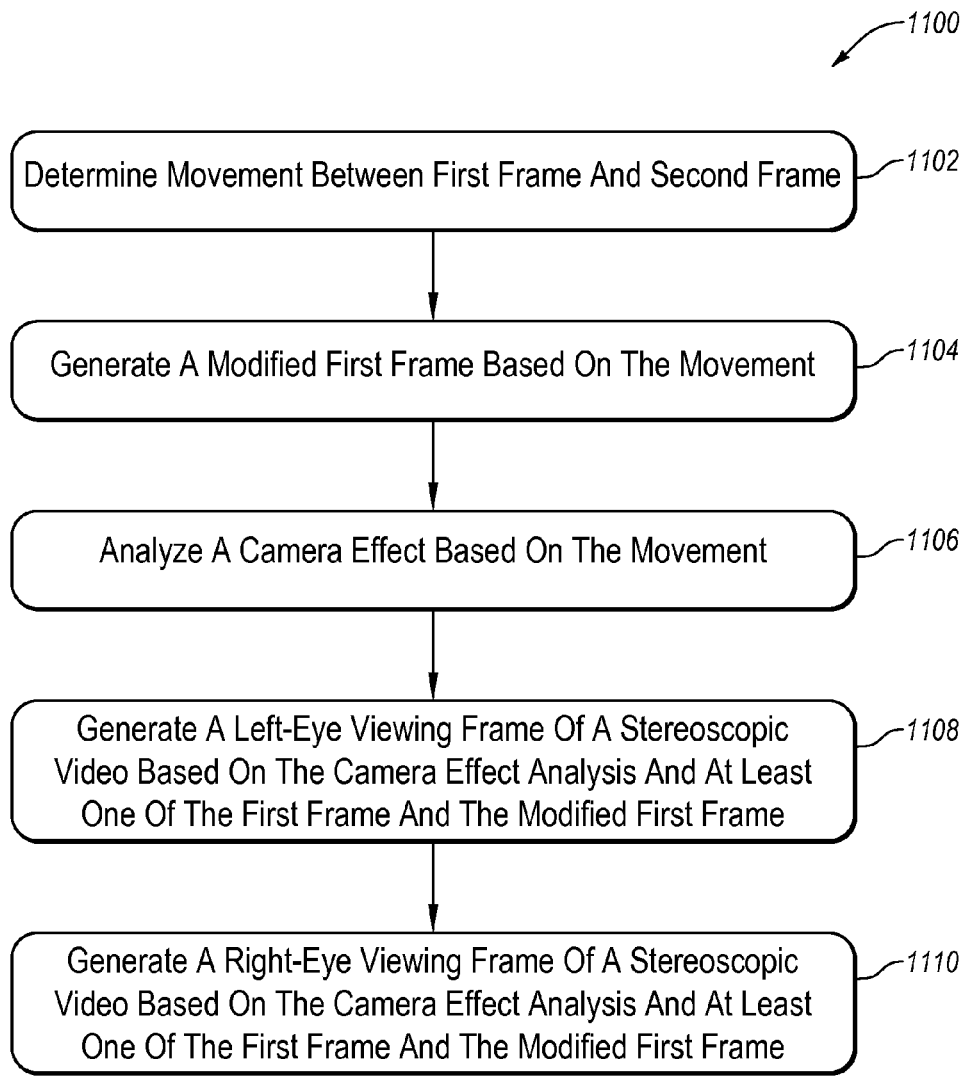
FIG. 11 is a flowchart of an example method of converting a monoscopic video into a stereoscopic video based on a camera effect.

The above description of FIGS. 1-10 illustrates that a stereoscopic video module (e.g., the stereoscopic video module 104 of FIG. 1) may be configured to generate left-eye and right-eye viewing frames for a stereoscopic video based on movement between frames of the monoscopic video and a determined camera effect associated with a monoscopic video, according to some embodiments described herein. FIG. 11 is a flowchart of an example method 1100 of converting a monoscopic video into a stereoscopic video based on a camera effect, according to some embodiments of the present disclosure. The method 1100 may be implemented, in some embodiments, by a stereoscopic video module, such as the stereoscopic video module 104 of FIG. 1. For instance, the stereoscopic video module 104 may be configured to execute computer instructions to perform operations for converting a monoscopic video into a stereoscopic video as represented by one or more of the blocks of the method 1100. Although illustrated as discrete blocks, various blocks may be divided into additional blocks, combined into fewer blocks, or eliminated, depending on the desired implementation.

Method 1100 may begin, and at block 1102, movement between a first frame of a monoscopic video and a second frame of the monoscopic video may be determined. At block 1104 a modified first frame may be generated based on the movement. In some embodiments, the modified first frame may be generated based on the description given with respect to FIG. 2. In other embodiments, the modified first frame may be generated based on an inferred frame as described with respect to FIG. 3.

At block 1106, a camera effect may be analyzed and determined based on the movement. For example, the camera effect may be determined to be a panning effect, a zooming effect, or neither. At block 1108, a left-eye viewing frame of a stereoscopic video may be generated based on the camera effect analysis and at least one of the first frame and the modified first frame. At block 1110, a right-eye viewing frame of the stereoscopic video may be generated based on the camera effect analysis and at least one of the first frame and the modified first frame. In the case of the zooming effect, in some embodiments a second modified first frame may also be generated based on the first frame and the second frame, and the left-eye and right-eye viewing frames may be generated based on at least one of the first modified first frame and the second modified first frame. In some embodiments, the left-eye and right-eye viewing frames may be generated in accordance with the descriptions given in FIGS. 4-10.

Therefore, the method 1100 may be used to convert a monoscopic video into a stereoscopic video. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 1100 may include steps associated with determining the background and/or foreground which may, in turn, be used for generating the stereoscopic video, such as described above with respect to FIGS. 9 and 10. In other embodiments, the foreground and background may be determined in another manner, or may be designated by an input.

Returning to FIG. 1, as mentioned above, the stereoscopic video module 104 may also be configured to adjust the amount of depth associated with the stereoscopic video 103 by adjusting the offset between elements included in the left-eye and right-eye viewing frames. As also mentioned above, in some embodiments, the stereoscopic video module 104 may also be configured to adjust a focus point of the stereoscopic video 103 such that the stereoscopic video module 104 may modify the perception of which elements may be within the foreground or background of a setting as perceived by the viewer. The adjustment of depth and the adjustment of the focus point are described below with respect to FIGS. 12A through 14.

Figure 12A:
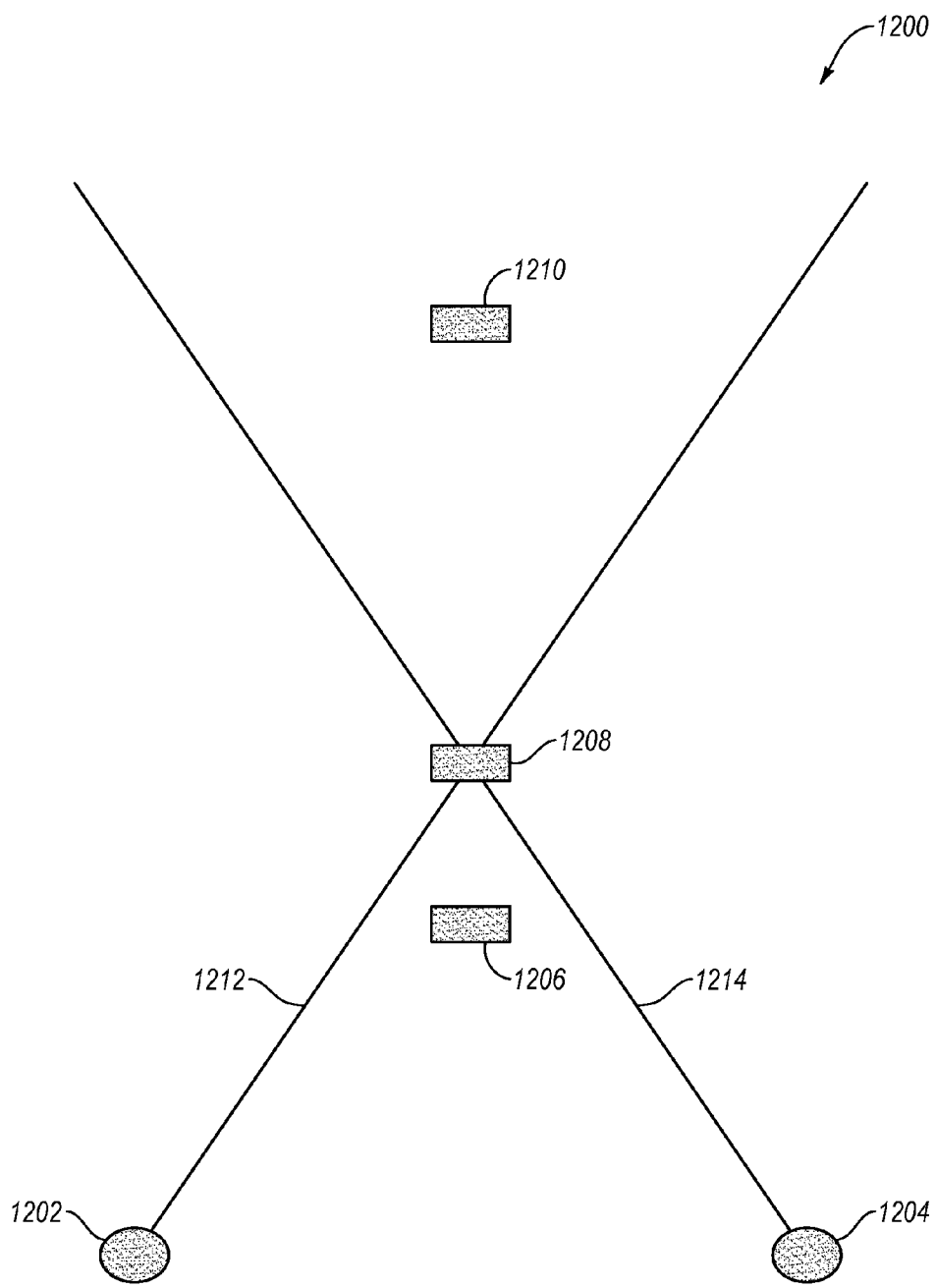
FIG. 12A illustrates an example setting that may be perceived by a left eye and a right eye.

FIG. 12A illustrates an example setting 1200 that may be perceived by a left eye 1202 and a right eye 1204, according to some embodiments. The setting 1200 may include a near element 1206, a midrange element 1208, and a far element 1210. In the illustrated example, the left eye 1202 and the right eye 1204 may be focused on the midrange element 1208 such that the midrange element 1208 may be at the focus point of the left eye 1202 and the right eye 1204. Therefore, the near element 1206 may be within the foreground as perceived by the left eye 1202 and the right eye 1204. Additionally, due to the left eye 1202 and the right eye 1204 being focused on the midrange element 1208, the far element 1210 may be within the background as perceived by the left eye 1202 and the right eye 1204.

Figure 12B:
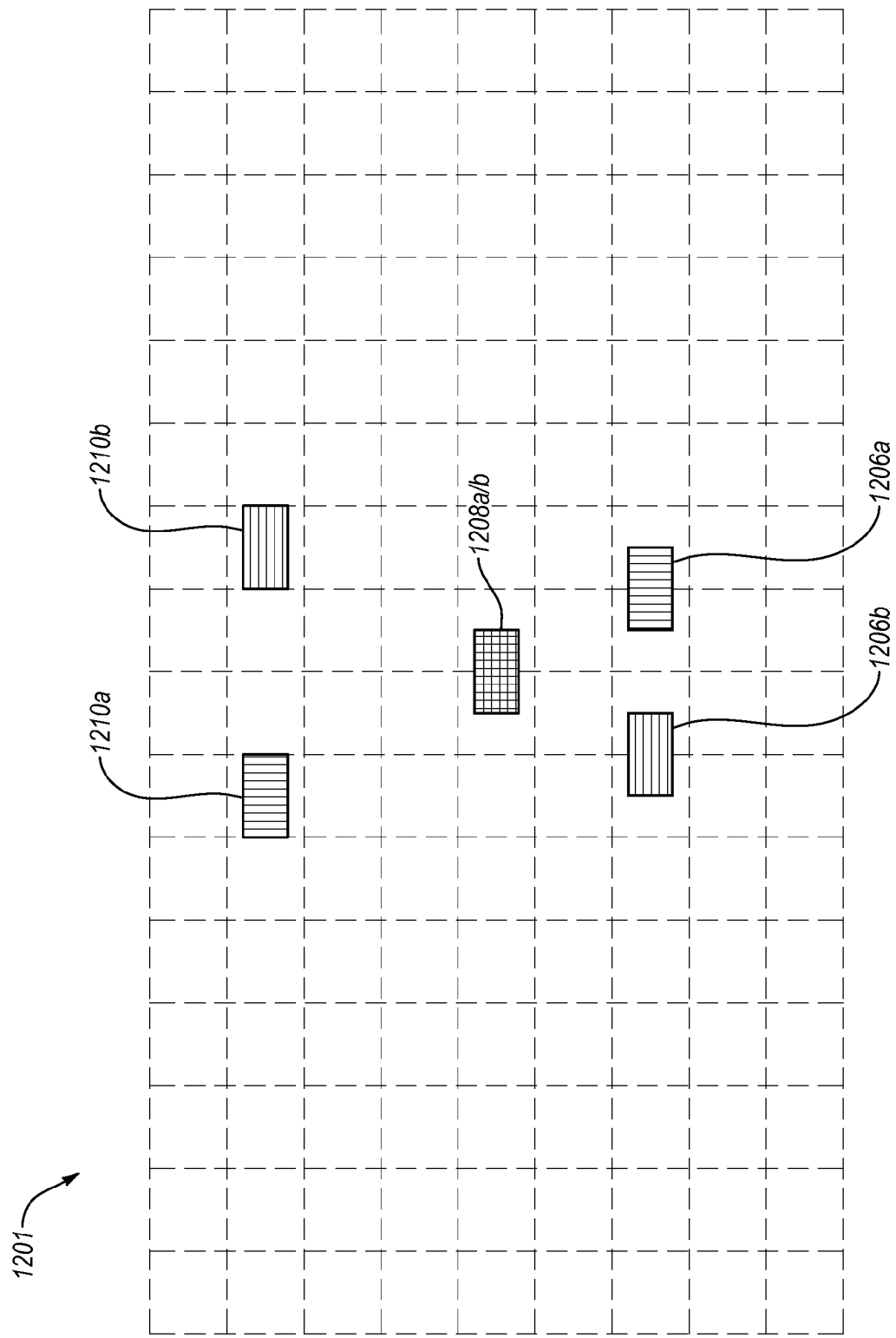
FIG. 12B depicts an example grid that illustrates example offsets that may be found between elements in a left-eye viewing frame and a right-eye viewing frame of a stereoscopic video associated with the setting of FIG. 12A.

FIG. 12B depicts an example grid 1201 that illustrates example offsets that may be found between the elements 1206, 1208, and 1210 in a left-eye viewing frame and a right-eye viewing frame of a stereoscopic video associated with the setting 1200, according to some embodiments disclosed herein. As mentioned above, the offsets of the elements 1206, 1208, and 1210 may mimic the different perspectives of the left eye 1202 and the right eye 1204 with respect to the setting 1200.

In the illustrated embodiment, a left-near element 1206*a* may represent the near element 1206 of FIG. 12A from the perspective of the left eye 1202 of FIG. 12A and a right-near element 1206*b* may represent the near element 1206 of FIG. 12A from the perspective of the right eye 1204 of FIG. 12A. Therefore, the difference in position of the left-near element 1206*a* with respect to the right-near element 1206*b* in the grid 1201 may represent the offset of the near element 1206 in the left-eye viewing frame with respect to the right-eye viewing frame of the associated stereoscopic video.

In the illustrated embodiment, the left-near element 1206*a* may be on the right because, as illustrated in FIG. 12A, the near element 1206 may be to the right of a line of sight 1212 associated with the left eye 1202. Additionally, the right-near element 1206*b* may be on the left because the near element 1206 may be to the left of a line of sight 1214 associated with the right eye 1204. This phenomenon is often referred to as "negative parallax" and occurs with objects that are in front of the focus point of two eyes, which may be set to be at the midrange element 1208 in the illustrated embodiment.

The midrange element 1208*a/b* of the grid 1201 may represent the midrange element 1208 of FIG. 12A from the perspective of both the left eye 1202 and the right eye 1204 of FIG. 12A. In the illustrated embodiment of FIG. 12A, the midrange element 1208 may be at the focus point of the left eye 1202 and the right eye 1204 such that there may be little to no offset between the perspectives of the left eye 1202 and the right eye 1204. Therefore, the midrange element 1208 may be in substantially the same place in the right-eye viewing frame and the left-eye viewing frame of the associated stereoscopic video. The midrange element 1208*a/b* of FIG. 12B accordingly illustrates the overlap of a left-midrange element 1208*a* as perceived by the left eye 1202 and a right-midrange element 1208*b* as perceived by the right eye 1204.

Additionally, a left-far element 1210*a* and a right-far element 1210*b* may represent the far element 1210 of FIG. 12A from the perspective of the left eye 1202 and right eye 1204, respectively, of FIG. 12A. Therefore, the difference in position of the left-far element 1210*a* with respect to the right-far element 1210*b* in the grid 1201 may represent the offset of the far element 1210 in the left-eye viewing frame with respect to the right-eye viewing frame of the associated stereoscopic video.

In the illustrated embodiment, the left-far element 1210*a* may be on the left because, as illustrated in FIG. 12A, the far element 1210 may be on the left of the line of sight 1212 associated with the left eye 1202. Further, the right-far element 1210*b* may be on the right because the far element 1210 may be to the right of the line of sight 1214 associated with the right eye 1204. This phenomenon is often referred to as "positive parallax" and occurs with objects that are behind the focus point of two eyes, which may be at the midrange element 1208 in the illustrated embodiment.

The amount of depth of a stereoscopic video may be adjusted by adjusting the offset between corresponding elements of a left-eye viewing frame and its associated right-eye viewing frame. For example, the amount of depth associated with the stereoscopic video associated with FIG. 12B may be adjusted by adjusting the offset between the left-near element 1206*a* and the right-near element 1206*b*, by adjusting the offset between the left-midrange element 1208*a* and the right-midrange element 1208*b*, and/or by adjusting the offset between the left-far element 1210*a* and the right-far element 1210*b*. In some embodiments of the present disclosure, the depth may be adjusted by applying a uniform multiplying factor to the offsets between elements.

Figure 12C:
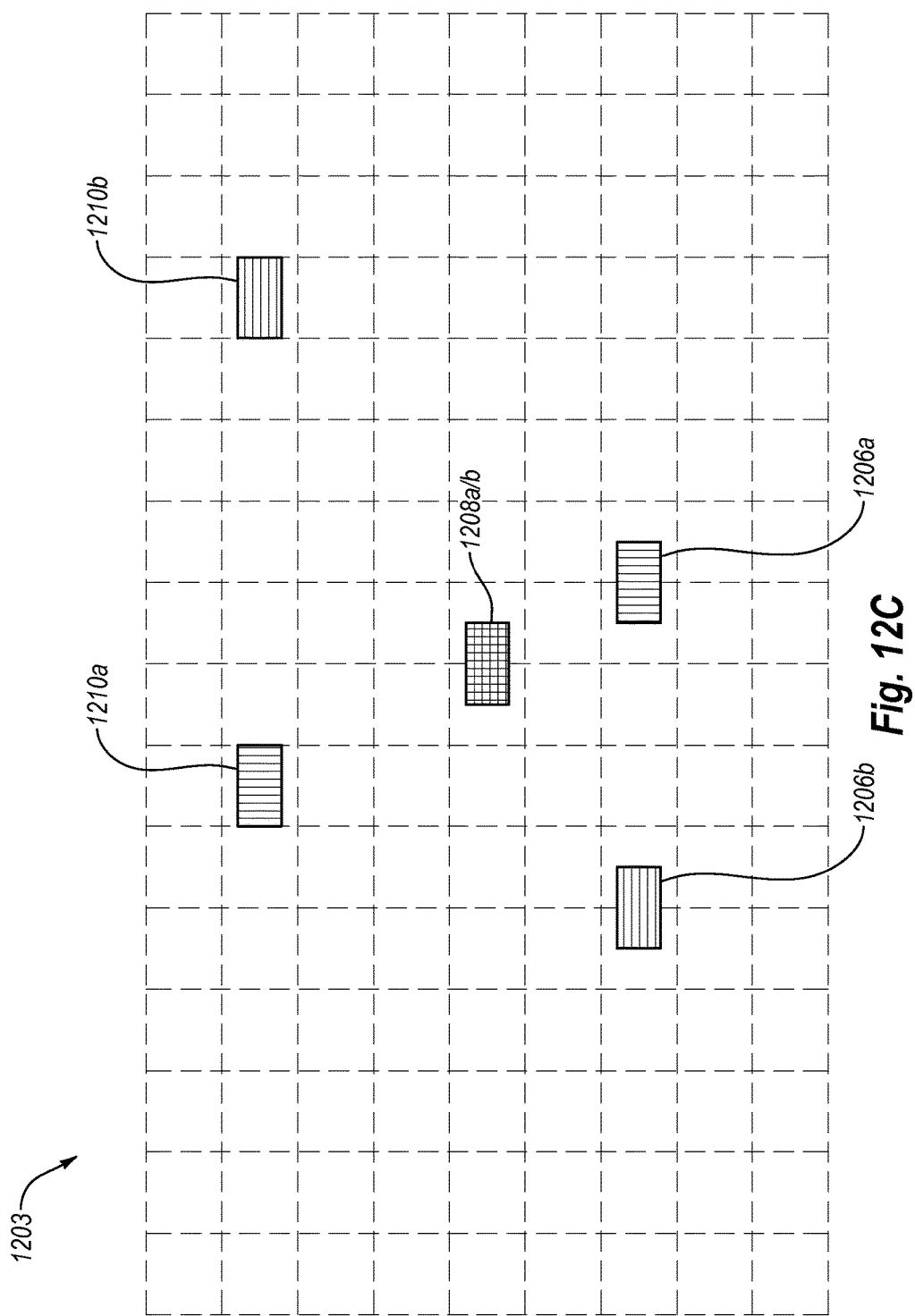
FIG. 12C depicts an example grid that illustrates the offsets of the elements of FIG. 12B with respect to their respective left-eye and right-eye viewing frames after applying a uniform multiplying factor to the offsets of FIG. 12B.

FIG. 12C depicts an example grid 1203 that illustrates the offsets of the elements of FIG. 12B with respect to their respective left-eye and right-eye viewing frames after applying a uniform multiplying factor to the offsets of FIG. 12B, according to some embodiments disclosed herein. The uniform multiplying factor may be applied to the offsets associated with substantially all the elements in the left-eye and the right-eye viewing frames such that the offsets between the elements are adjusted by substantially the same scale. In the illustrated embodiment, the uniform multiplying factor may have a value of two and may be applied to the offsets between the elements 1206, 1208, and 1210 of FIG. 12B such that the offsets between the elements 1206, 1208, and 1210 in FIG. 12C may each be doubled with respect to the corresponding offsets in FIG. 12B.

For example, in FIG. 12B a near element offset between the center of the left-near element 1206*a* and the center of the right-near element 1206*b* may be approximately "2" grid units. Therefore, applying a multiplying factor of "2" to the near element offset may result in the near element offset between the center of the left-near element 1206*a* and the center of the right-near element 1206*b* in FIG. 12C being approximately "4" grid units, as illustrated in FIG. 12C.

Additionally, a midrange element offset between the left-midrange element 1208*a* and the right-midrange element 1208*b* may be approximately "0" grid units. Therefore, applying a multiplying factor of "2" to the midrange element offset may result in the midrange element offset between the left-midrange element 1208*a* and the right-midrange element 1208*b* in FIG. 12C still being approximately "0" grid units because a number multiplied by "0" is still "0."

Further, in FIG. 12B a far element offset between the center of the left-far element 1210*a* and the center of the right-far element 1210*b* may be approximately "3" grid units. Therefore, applying a multiplying factor of "2" to the far element offset may result in the far element offset between the center of the left-far element 1210*a* and the center of the right-far element 1210*b* in FIG. 12C being approximately "6" grid units, as illustrated in FIG. 12C.

In the illustrated embodiment, the right-near element 1206*b* associated with the right-eye viewing frame may be shifted to the left by approximately "2" grid units and the left-near element 1206*a* associated with the left-eye viewing frame may not be shifted in FIG. 12C with respect to FIG. 12B. Additionally, in the illustrated embodiment, the right-far element 1210*b* associated with the right-eye viewing frame may be shifted to the right by "3" grid units and the left-far element 1210*a* associated with the left-eye viewing frame may not be shifted in FIG. 12C with respect to FIG. 12B. Therefore, the near element offset may increase from "2" grid units to "4" grid units and the far element offset may increase from "3" grid units to "6" grid units in FIG. 12C with respect to FIG. 12B by adjusting the right-eye viewing frame without having to adjust the left-eye viewing frame also.

In alternative embodiments, in FIG. 12C with respect to FIG. 12B, the near element offset and the far element offset may be adjusted by shifting the left-near element 1206*a* and the left-far element 1210*a* within the left-eye viewing frame instead of shifting the right-near element 1206*b* and the right-far element 1210*b* in the right-eye viewing frame. In other embodiments, in FIG. 12C with respect to FIG. 12B, the near element offset may be adjusted by shifting both the left-near element 1206*a* and the right-near element 1206*b*. Further, in some of these or other embodiments, in FIG. 12C with respect to FIG. 12B, the far element offset may be adjusted by shifting both the left-far element 1210*a* and the right-far element 1210*b*.

Although a specific uniform multiplying factor of "2" is used in the above example, any suitable multiplying factor may be used. For example, any suitable multiplying factor greater than "1" may be used to increase the amount of depth perceived by a viewer. Additionally, any suitable multiplying factor less than "1" may be used to decrease the amount of depth perceived by a viewer. Further, although the uniform multiplying factor is described above as being applied to offsets associated with corresponding elements, in some embodiments, the elements may each include one or more pixels, and the uniform multiplying factor may be applied to offsets associated with corresponding pixels. In some embodiments, the uniform multiplying factor may be applied to every offset associated with every element and/or pixel.

Accordingly, in accordance with some embodiments of the present disclosure, a stereoscopic video module (e.g., the stereoscopic video module 104) may be configured to adjust depth associated with a stereoscopic video by applying a uniform multiplying factor to the offsets between corresponding elements and/or pixels associated with the left-eye viewing frames and the corresponding right-eye viewing frames of the stereoscopic video. In contrast, traditional depth adjustment procedures may not apply uniform scaling of the offsets to adjust the depth.

The focus point of a stereoscopic video may also be adjusted by adjusting the offsets between corresponding elements of a left-eye viewing frame and its associated right-eye viewing frame. For example, the focus point of the stereoscopic video associated with FIG. 12B may be adjusted by adjusting the offset between the left-near element 1206*a* and the right-near element 1206*b*, by adjusting the offset between the left-far element 1210*a* and the right-far element 1210*b*, and by adjusting the offset between the left-midrange element 1208*a* and the right-midrange element 1208*b*. In some embodiments, the focus point may be adjusted by applying a uniform summing factor to the offsets between elements. The uniform summing factor may be applied to the offsets associated with substantially all the elements in the left-eye and the right-eye viewing frames. Additionally, in some embodiments, the uniform summing factor may be applied to the offsets associated with corresponding pixels of the left-eye and right-eye viewing frames.

Figure 12D:
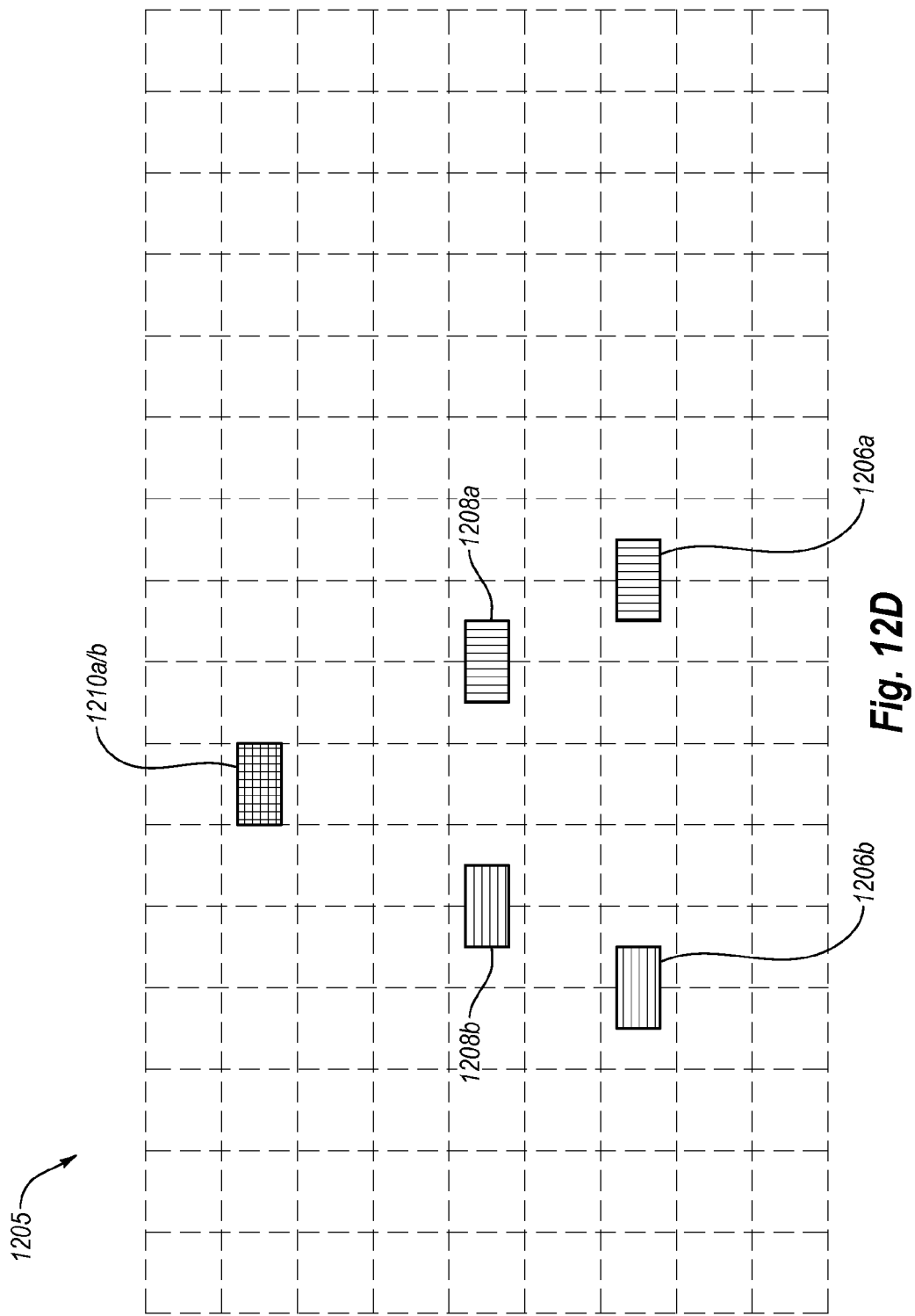
FIG. 12D depicts an example grid that illustrates the offsets of the elements of FIG. 12B with respect to their respective left-eye and right-eye viewing frames after applying a uniform summing factor to the offsets of FIG. 12B.

FIG. 12D depicts an example grid 1205 that illustrates the offsets of the elements of FIG. 12B with respect to their respective left-eye and right-eye viewing frames after applying a uniform summing factor to the offsets of FIG. 12B, according to some embodiments disclosed herein. In the illustrated embodiment, the uniform summing factor may be applied such that the elements associated with the right-eye viewing frame are shifted to the left with respect to the elements associated with the left-eye viewing frame. Such shifting to the left of the right-eye viewing frame elements with respect to the left-eye viewing frame elements may result in moving the focus point back such that more elements are perceived as being within the foreground.

In other embodiments, the uniform summing factor may be applied such that the elements associated with the right-eye viewing frame are shifted to the right with respect to the elements associated with the left-eye viewing frame. Such shifting to the right of the right-eye viewing frame elements with respect to the left-eye viewing frame elements may result in moving the focus point forward such that more elements are perceived as being within the background.

In the illustrated embodiment, the uniform summing factor may have a value of "−3" and may be applied to the offsets between the elements 1206, 1208, and 1210 of FIG. 12B such that the right-eye viewing frame elements may each be shifted to the left by three grid units with respect to their corresponding left-eye viewing frame elements. In the illustrated embodiment, a negative summing factor may result in a shift to the left of the right-eye viewing frame elements with respect to the left-eye viewing frame elements and a positive summing factor may result in a shift to the right of the right-eye viewing frame elements with respect to the left-eye viewing frame elements. However, in other embodiments, a positive summing factor may result in a shift to the left of the right-eye viewing frame elements with respect to the left-eye viewing frame elements and a negative summing factor may result in a shift to the right of the right-eye viewing frame elements with respect to the left-eye viewing frame elements.

For example, in FIG. 12B a near element offset between the center of the left-near element 1206a and the center of the right-near element 1206b may be "2" grid units. Therefore, applying a summing factor of "−3" to the near element offset illustrated in FIG. 12B may result in shifting the right-near element 1206b "3" grid units to the left with respect to the left-near element 1206a such that the near offset between the center of the left-near element 1206a and the center of the right-near element 1206b may be "5" grid units after applying the summing factor, which is depicted in FIG. 12D.

Additionally, a midrange element offset between the left-midrange element 1208a and the right-midrange element 1208b may be approximately "0" grid units. Therefore, applying a summing factor of "−3" to the midrange element offset illustrated in FIG. 12B may result in shifting the right-midrange element 1208b "3" grid units to the left with respect to the left-midrange element 1208a such that the midrange offset between the center of the left-midrange element 1208a and the center of the right-midrange element 1208b may be "3" grid units after applying the summing factor, which is depicted in FIG. 12D.

Further, in FIG. 12B a far element offset between the center of the left-far element 1210a and the center of the right-far element 1210b may be "3" grid units. Therefore, applying a summing factor of "−3" to the far element offset illustrated in FIG. 12B may result in shifting the right-far element 1210b "3" grid units to the left with respect to the left-near element 1210a such that the far offset between the center of the left-far element 1210a and the center of the right-far element 1210b may be "0" grid units after applying the summing factor, which is depicted in FIG. 12D.

In the illustrated embodiment, the right-near element 1206b, the right-midrange element 1208b, and the right-far element 1210b associated with the right-eye viewing frame may each be shifted to the left by "3" grid units and the left-near element 1206a, the left-midrange element 1208a, and the left-far element 1210a associated with the left-eye viewing frame may not be shifted in FIG. 12D with respect to FIG. 12B to obtain the desired amount of offset adjustment. In alternative embodiments, the near offset, the midrange offset, and the far offset may be adjusted by shifting any one of the left-near element 1206a, the right-near element 1206b, the left-midrange element 1208a, the right-midrange element 1208b, the left-far element 1210a, and/or the right-far element 1210b in FIG. 12D with respect to FIG. 12B.

Additionally, the illustrated embodiment depicts shifting the elements associated with the right-eye viewing frame to the left with respect to their corresponding elements in the left-eye viewing frame to move the focus point back, which may bring more elements within the foreground as perceived by a viewer. However, as indicated above, in other embodiments, the elements associated with the right-eye viewing frame may be shifted to the right with respect to their corresponding elements in the left-eye viewing frame to move the focus point forward, which may bring more elements within the background as perceived by a viewer.

Accordingly, in accordance with some embodiments of the present disclosure, a stereoscopic video module (e.g., the stereoscopic video module 104) may be configured to adjust a focus point associated with a stereoscopic video by applying a uniform summing factor to the offsets between corresponding elements and/or pixels associated with the left-eye viewing frames and the corresponding right-eye viewing frames of the stereoscopic video.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 13:
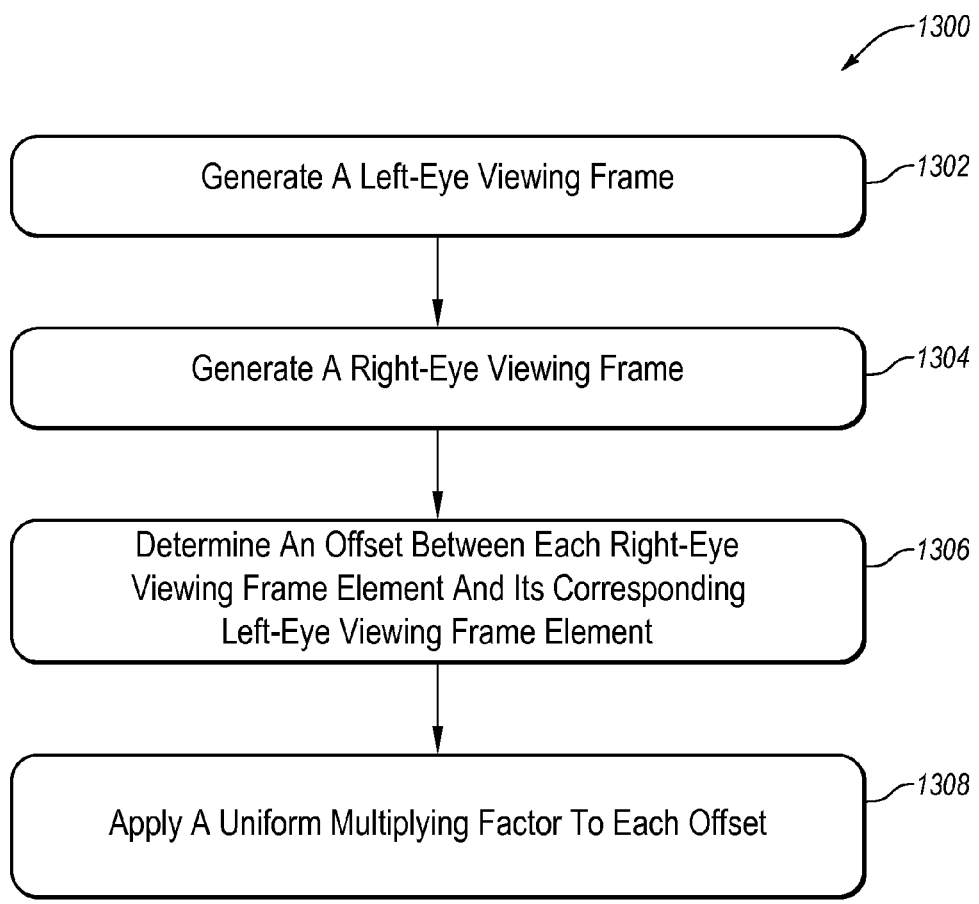
FIG. 13 is a flowchart of an example method of adjusting the depth of a stereoscopic video.

FIG. 13 is a flowchart of an example method 1300 of adjusting the depth of a stereoscopic video, according to some embodiments of the present disclosure. The method 1300 may be implemented, in some embodiments, by a stereoscopic video module, such as the stereoscopic video module 104 of FIG. 1. For instance, the stereoscopic video module 104 may be configured to execute computer instructions to perform operations for adjusting depth of a stereoscopic video as represented by one or more of the blocks of the method 1300. Although illustrated as discrete blocks, various blocks may be divided into additional blocks, combined into fewer blocks, or eliminated, depending on the desired implementation.

Method 1300 may begin, and at block 1302 a left-eye viewing frame of a stereoscopic video may be generated. The left-eye viewing frame may include multiple left-eye viewing frame elements. In some embodiments, the left-eye viewing frame elements may be substantially all the elements included in the left-eye viewing frame such that the left-eye viewing frame elements may encompass substantially the entire left-eye viewing frame. Additionally, the left-eye viewing frame elements may each include one or more pixels.

At block 1304, a right-eye viewing frame of the stereoscopic video may be generated. The right-eye viewing frame may correspond to the left-eye viewing frame and may include a plurality of right-eye viewing frame elements. Each right-eye viewing frame element may correspond to one of the left-eye viewing frame elements. In some embodiments, the right-eye viewing frame elements may be substantially all the elements included in the right-eye viewing frame such that the right-eye viewing frame elements may encompass substantially the entire right-eye viewing frame. Additionally, the right-eye viewing frame elements may each include one or more pixels.

At block 1306, an offset between each left-eye viewing frame element and its corresponding right-eye viewing frame element may be determined. In some embodiments, the offset may be determined on a pixel-by-pixel basis. At block 1308 a uniform multiplying factor may be applied to each offset such that a depth associated with the stereoscopic video may be adjusted on a substantially uniform scale.

Therefore, the method 1300 may be used to adjust the depth of a stereoscopic video. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 1300 may include steps associated with generating the left-eye viewing frame and the right-eye viewing frame. In some of these embodiments, the left-eye viewing frame and the right-eye viewing frame may be generated according to one or more manners described above with respect to FIGS. 1-11.

Figure 14:
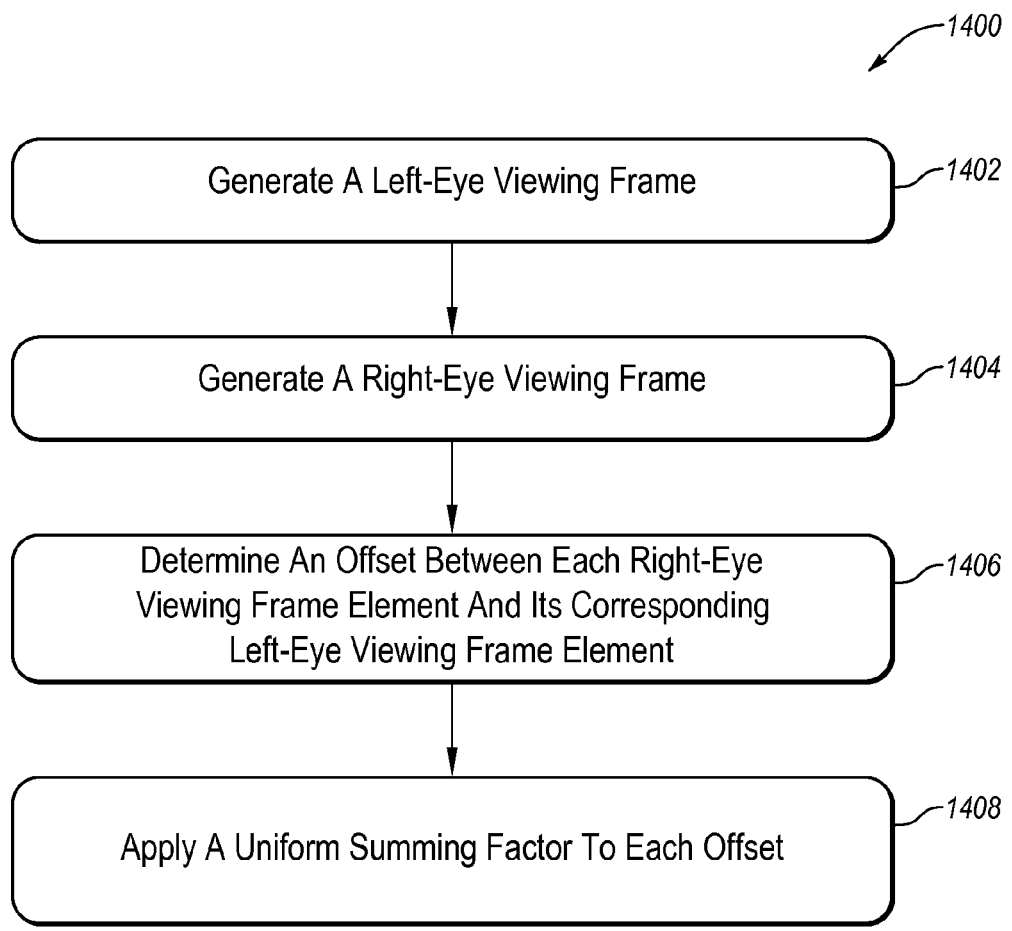
FIG. 14 is a flow chart of an example method of adjusting the focus point of a stereoscopic video, all arranged in accordance with at least some embodiments described herein.

FIG. 14 is a flowchart of an example method 1400 of adjusting the focus point of a stereoscopic video, according to some embodiments of the present disclosure. The method 1400 may be implemented, in some embodiments, by a stereoscopic video module, such as the stereoscopic video module 104 of FIG. 1. For instance, the stereoscopic video module 104 may be configured to execute computer instructions to perform operations for adjusting the focus point of a stereoscopic video as represented by one or more of the blocks of the method 1400. Although illustrated as discrete blocks, various blocks may be divided into additional blocks, combined into fewer blocks, or eliminated, depending on the desired implementation.

Method 1400 may begin, and at block 1402 a left-eye viewing frame of a stereoscopic video may be generated. The left-eye viewing frame may include multiple left-eye viewing frame elements. In some embodiments, the left-eye viewing frame elements may be substantially all the elements included in the left-eye viewing frame such that the left-eye viewing frame elements may encompass substantially the entire left-eye viewing frame. Additionally, the left-eye viewing frame elements may each include one or more pixels.

At block 1404, a right-eye viewing frame of the stereoscopic video may be generated. The right-eye viewing frame may correspond to the left-eye viewing frame and may include a plurality of right-eye viewing frame elements. Each right-eye viewing frame element may correspond to one of the left-eye viewing frame elements. In some embodiments, the right-eye viewing frame elements may be substantially all the elements included in the right-eye viewing frame such that the right-eye viewing frame elements may encompass substantially the entire right-eye viewing frame. Additionally, the right-eye viewing frame elements may each include one or more pixels.

At block 1406, an offset between each left-eye viewing frame element and its corresponding right-eye viewing frame element may be determined. In some embodiments, the offset may be determined on a pixel-by-pixel basis. At block 1408 a uniform summing factor may be applied to each offset. The uniform summing factor may be applied such that each right-eye viewing frame element may uniformly shift by substantially the same amount with respect to its corresponding left-eye viewing frame element. The shifting may thus adjust a focus point associated with the stereoscopic video.

Therefore, the method 1400 may be used to adjust the focus point of a stereoscopic video. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 1400 may include steps associated with generating the left-eye viewing frame and the right-eye viewing frame. In some of these embodiments, the left-eye viewing frame and the right-eye viewing frame may be generated according to one or more manners described above with respect to FIGS. 1-11.

The embodiments described herein may include the use of a special purpose or general purpose computer, including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

The computer-executable instructions may be executed by a processing device and may include, for example, instructions and data that cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein may be implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of analyzing a video, the method comprising:
   determining movement of all elements within a video between a first frame of the video and a second frame of the video;
   determining, based on the determined movement, whether the movement of all the elements is in a uniform movement direction or whether two or more elements have a disparate movement direction;
   determining, in response to determining that two or more elements have a disparate movement direction, whether a scene of the video that is associated with the first frame of the video and the second frame of the video includes a dominant element, wherein determining whether the scene includes a dominant element is based on numbers of pixels associated with elements included in the scene and whether one of the elements has more pixels associated with it than any of the other elements;

determining, in response to determining that the scene includes the dominant element, a position of the dominant element within the scene; and determining a foreground and a background within the video based on the position of dominant element.

2. The method of claim 1, further comprising:

determining that the position of the dominant element is substantially at a center of the scene; and correlating the foreground with the dominant element based on the dominant element being substantially at the center of the scene.

3. The method of claim 1, further comprising:

determining that the position of the dominant element is substantially off-center within the scene; and correlating the background with the dominant element based on the dominant element being substantially off-center within the scene.

4. The method of claim 1, further comprising:

determining an extent of movement between the background and the foreground based on the first frame and the second frame; and generating a left-eye viewing frame and a right-eye viewing frame of a stereoscopic video based on the extent of movement.

5. At least one non-transitory computer-readable storage media, including computer-executable instructions configured to cause a system to perform operations to analyze a video, the operations comprising:

determining movement of all elements within a video between a first frame of the video and a second frame of the video;

determining, based on the determined movement, whether the movement of all the elements is in a uniform movement direction or whether two or more elements have a disparate movement direction;

determining, in response to determining that two or more elements have a disparate movement direction, whether a scene of the video that is associated with the first frame of the video and the second frame of the video includes a dominant element, wherein determining whether the scene includes a dominant element is based on numbers of pixels associated with elements included in the scene and whether one of the elements has more pixels associated with it than any of the other elements;

determining, in response to determining that the scene includes the dominant element, a position of the dominant element within the scene; and determining a foreground and a background within the video based on the position of the dominant element.

6. The at least one non-transitory computer-readable storage media of claim 5, wherein the operations further comprise:

determining that the dominant element is substantially at a center of the scene; and correlating the foreground with the dominant element based on the position of the dominant element being substantially at the center of the scene.

7. The at least one non-transitory computer-readable storage media of claim 5, wherein the operations further comprise:

determining that the dominant element is substantially off-center within the scene; and correlating the background with the dominant element based on the position of the dominant element being substantially off-center within the scene.

8. The at least one non-transitory computer-readable storage media of claim 5, wherein the operations further comprise:

determining an extent of movement between the background and the foreground based on the first frame and the second frame; and generating a left-eye viewing frame and a right-eye viewing frame of a stereoscopic video based on the extent of movement.

* * * * *